United States Patent
Kiyonaga et al.

(10) Patent No.: US 10,519,837 B2
(45) Date of Patent: *Dec. 31, 2019

(54) COMBUSTION SYSTEM

(71) Applicants: The Chugoku Electric Power Co., Inc., Hiroshima (JP); Tokyo Metropolitan University, Tokyo (JP)

(72) Inventors: Eiji Kiyonaga, Hiroshima (JP); Kenji Hikino, Hiroshima (JP); Keiichiro Morita, Hiroshima (JP); Masatake Haruta, Tokyo (JP); Toru Murayama, Tokyo (JP); Makoto Mino, Tokyo (JP)

(73) Assignees: CHUGOKU ELECTRIC POWER CO., INC., Hiroshima (JP); TOKYO METROPOLITAN UNIVERSITY, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/764,233

(22) PCT Filed: Mar. 7, 2017

(86) PCT No.: PCT/JP2017/009044
§ 371 (c)(1),
(2) Date: Mar. 28, 2018

(87) PCT Pub. No.: WO2018/047377
PCT Pub. Date: Mar. 15, 2018

(65) Prior Publication Data
US 2019/0055871 A1    Feb. 21, 2019

(30) Foreign Application Priority Data

Sep. 12, 2016 (WO) .................. PCT/JP2016/076870

(51) Int. Cl.
*F01N 3/28* (2006.01)
*B01J 23/22* (2006.01)
(Continued)

(52) U.S. Cl.
CPC ....... *F01N 3/2842* (2013.01); *B01D 53/8628* (2013.01); *B01D 53/90* (2013.01);
(Continued)

(58) Field of Classification Search
CPC .......................... B01D 53/8628; B01D 53/90; B01D 53/9418; B01D 53/96; B01D 2251/206;
(Continued)

(56) References Cited

U.S. PATENT DOCUMENTS

| 4,466,947 A | 8/1984 | Imanari et al. |
| 4,833,113 A | 5/1989 | Imanari et al. |

(Continued)

FOREIGN PATENT DOCUMENTS

| EP | 2610454 A1 * | 7/2013 | ......... B01D 53/9409 |
| EP | 2610454 A1 | 7/2013 | |

(Continued)

OTHER PUBLICATIONS

United States Patent and Trademark Office, Office Action issued in the U.S. Appl. No. 15/764,222, dated Nov. 13, 2018, 9 pages.

(Continued)

*Primary Examiner* — Brandon D Lee
(74) *Attorney, Agent, or Firm* — Muncy, Geissler, Olds & Lowe, P.C.

(57) ABSTRACT

A combustion system operated at low cost is provided. A combustion system 1 includes a combustion device 10 that burns fuel, an exhaust line L1 through which exhaust gas flows, the exhaust gas being generated through combustion of the fuel in the combustion device 10, a dust collector 50 that is disposed in the exhaust line L1 and that collects dust (Continued)

in the exhaust gas, and a denitration device 90 that is disposed in the exhaust line L1 and that removes nitrogen oxide from the exhaust gas using a denitration catalyst. The denitration device 90 is disposed downstream from the dust collector 50 in the exhaust line L1. The denitration catalyst contains 43 wt % or more of vanadium pentoxide and has a BET specific surface area of 30 m$^2$/g or more.

5 Claims, 16 Drawing Sheets

(51) Int. Cl.

| | | |
|---|---|---|
| *B01D 53/90* | (2006.01) | |
| *B01D 53/86* | (2006.01) | |
| *B01D 53/94* | (2006.01) | |
| *F01N 5/02* | (2006.01) | |
| *B01J 35/10* | (2006.01) | |
| *B01J 37/08* | (2006.01) | |
| *F01N 3/20* | (2006.01) | |
| *B01D 53/96* | (2006.01) | |
| *B01J 23/92* | (2006.01) | |
| *B01J 38/64* | (2006.01) | |
| *B01J 38/66* | (2006.01) | |
| *B01J 38/02* | (2006.01) | |
| *B01J 38/48* | (2006.01) | |
| *B01J 37/00* | (2006.01) | |
| *F01N 3/021* | (2006.01) | |
| *F01N 3/02* | (2006.01) | |
| *F01N 13/00* | (2010.01) | |
| *B01J 37/02* | (2006.01) | |
| *B01J 37/03* | (2006.01) | |
| *B01J 35/00* | (2006.01) | |

(52) U.S. Cl.
CPC ......... *B01D 53/9418* (2013.01); *B01D 53/96* (2013.01); *B01J 23/22* (2013.01); *B01J 23/92* (2013.01); *B01J 35/002* (2013.01); *B01J 35/1014* (2013.01); *B01J 37/0009* (2013.01); *B01J 37/0219* (2013.01); *B01J 37/036* (2013.01); *B01J 37/08* (2013.01); *B01J 37/082* (2013.01); *B01J 37/088* (2013.01); *B01J 38/02* (2013.01); *B01J 38/485* (2013.01); *B01J 38/64* (2013.01); *B01J 38/66* (2013.01); *F01N 3/021* (2013.01); *F01N 3/0205* (2013.01); *F01N 3/208* (2013.01); *F01N 3/2066* (2013.01); *F01N 3/28* (2013.01); *F01N 3/2803* (2013.01); *F01N 13/009* (2014.06); *B01D 53/9436* (2013.01); *B01D 2251/206* (2013.01); *B01D 2255/20707* (2013.01); *B01D 2255/20723* (2013.01); *B01D 2255/9207* (2013.01); *B01D 2258/012* (2013.01); *B01D 2259/4566* (2013.01); *F01N 2330/00* (2013.01); *F01N 2330/06* (2013.01); *F01N 2330/08* (2013.01); *F01N 2330/42* (2013.01); *F01N 2370/02* (2013.01); *F01N 2510/068* (2013.01); *F01N 2570/14* (2013.01); *F01N 2590/02* (2013.01); *F01N 2610/02* (2013.01); *Y02T 10/16* (2013.01)

(58) Field of Classification Search
CPC .......... B01D 2255/20707; B01D 2255/20723; B01D 2255/9207; B01D 2258/012; B01D 2259/4566; B01D 53/9436; B01J 23/22; B01J 23/92; B01J 35/002; B01J 35/1014; B01J 37/0009; B01J 37/0219; B01J 37/036; B01J 37/08; B01J 37/082; B01J 37/088; B01J 38/02; B01J 38/485; B01J 38/64; B01J 38/66; F01N 13/009; F01N 3/0205; F01N 3/021; F01N 3/2066; F01N 3/208; F01N 3/28; F01N 3/2803; F01N 3/2842; F01N 5/02; F01N 2330/00; F01N 2330/06; F01N 2330/08; F01N 2330/42; F01N 2370/02; F01N 2510/068; F01N 2570/14; F01N 2590/02; F01N 2610/02; Y02T 10/16

See application file for complete search history.

(56) References Cited

U.S. PATENT DOCUMENTS

| | | |
|---|---|---|
| 4,891,348 A | 1/1990 | Imanari et al. |
| 5,087,600 A | 2/1992 | Kato |
| 5,696,049 A | 12/1997 | Ikeyama et al. |
| 6,027,697 A | 2/2000 | Kurihara et al. |
| 7,256,155 B2 | 8/2007 | Nojima et al. |
| 8,661,993 B2 | 3/2014 | Kamiyama |
| 9,192,920 B2 | 11/2015 | Nochi |
| 9,623,402 B2 | 4/2017 | Masuda |
| 9,851,101 B2 | 12/2017 | Masuda |
| 2004/0180783 A1 | 9/2004 | Nojima et al. |
| 2011/0150731 A1 | 6/2011 | Schermanz et al. |
| 2011/0311424 A1 | 12/2011 | Ellery |
| 2014/0080695 A1 | 3/2014 | Nochi et al. |
| 2014/0271383 A1 | 9/2014 | Marrino et al. |
| 2015/0224486 A1* | 8/2015 | Bauer ............... B01J 37/0246 423/213.5 |
| 2015/0246823 A1 | 9/2015 | Yang et al. |
| 2016/0245511 A1 | 8/2016 | Masuda et al. |
| 2016/0288094 A1 | 10/2016 | Malmberg et al. |
| 2018/0085694 A1 | 3/2018 | Imada |
| 2018/0272278 A1 | 9/2018 | Kiyonaga et al. |
| 2018/0272318 A1 | 9/2018 | Kiyonaga et al. |
| 2018/0280875 A1 | 10/2018 | Kiyonaga et al. |
| 2018/0280936 A1 | 10/2018 | Kiyonaga et al. |
| 2018/0280941 A1 | 10/2018 | Kiyonaga et al. |
| 2018/0280965 A1 | 10/2018 | Kiyonaga et al. |

FOREIGN PATENT DOCUMENTS

| | | |
|---|---|---|
| JP | S51104489 A | 9/1976 |
| JP | S52035786 A | 3/1977 |
| JP | S54-004873 A | 1/1979 |
| JP | S5455390 A | 5/1979 |
| JP | S56168835 A | 12/1981 |
| JP | 59032712 | 2/1984 |
| JP | S59049847 A | 3/1984 |
| JP | S59217414 A | 12/1984 |
| JP | H04225842 A | 8/1992 |
| JP | H06277512 A | 10/1994 |
| JP | H07060134 A | 3/1995 |
| JP | H07241476 A | 9/1995 |
| JP | H09103646 A | 4/1997 |
| JP | 11253754 | 9/1999 |
| JP | 2004275852 A | 10/2004 |
| JP | 2005342710 | 12/2005 |
| JP | 2011190940 | 9/2011 |
| JP | 2012047096 A | 3/2012 |
| JP | 2012524646 A | 10/2012 |
| JP | 2014065031 A | 4/2014 |
| JP | 2014213293 A | 11/2014 |
| JP | 2015530921 A | 10/2015 |
| JP | 2015533766 A | 11/2015 |
| JP | 2016513582 A | 5/2016 |
| JP | 2017018919 A | 1/2017 |
| JP | 2017503632 A | 2/2017 |
| JP | 6093101 B1 | 3/2017 |
| WO | WO94/21373 | 9/1994 |
| WO | WO2008105469 A1 | 9/2008 |
| WO | WO2014/143465 A1 | 9/2014 |

(56) References Cited

FOREIGN PATENT DOCUMENTS

| WO | WO2015110821 A1 | 7/2015 |
|---|---|---|
| WO | WO2017042895 A1 | 3/2017 |

OTHER PUBLICATIONS

United States Patent and Trademark Office, Office Action issued in the U.S. Appl. No. 15/764,234, dated Jan. 7, 2019, 7 pages.

Office Action dated May 20, 2019 in IN Patent Application No. IN201817011046, 6 pages.

Kasaoka et al., "Research of High Active Vanadium Oxides Catalysts for Low Temperature-Reduction of Nitrogen Oxides with Ammonia," Environmental Conservation Engineering, 1979, vol. 8, No. 7, pp. 676-684.

Notification of Reasons for Refusal dated Nov. 15, 2016 in Application No. JP2016-560930 (3 pages).

Mino et al., "NH3 Catalytic Selective Reduction at Low Temperatures of No Using Vanadium Oxide," Dai 118 Kai CatSJ Meeting Toronkai A Yokoshu, Sep. 14, 2016, 4 pages.

Notification of Reasons for Refusal dated Oct. 16, 2018 in JP Application No. 2018-533851 is attached.

Notification of Reasons for Refusal dated Oct. 16, 2018 in JP Application No. 2018-533706 is attached.

Notification of Reasons for Refusal dated Oct. 16, 2018 in JP Application No. 2018-533852 is attached.

Notification of Reasons for Refusal dated Oct. 16, 2018 in JP Application No. 2018-533707 is attached.

Office Action issued in related IN Patent Application No. IN201817011508, dated Sep. 27, 2019.

Office Action dated Oct. 30, 2019 in related U.S. Appl. No. 15/764,245, 7 pages.

\* cited by examiner

COMBUSTION SYSTEM

TECHNICAL FIELD

The present invention relates to a combustion system. More specifically, the present invention relates to a combustion system including a combustion device, an exhaust line through which exhaust gas flows, a dust collector that collects dust in the exhaust gas, and a denitration device that removes nitrogen oxide from the exhaust gas.

BACKGROUND ART

In existing combustion systems including a boiler, thermal energy is generated as a result of combustion of fuel such as coal in the boiler, and then, for example, the thermal energy is converted into electric energy. The combustion of fuel in the boiler generates an exhaust gas containing nitrogen oxide.

The exhaust gas generated in the boiler is discharged to the outside from the b through an exhaust line. In consideration of environmental factors, nitrogen oxide is removed, by a denitration device, from the exhaust gas that is discharged to the outside from the boiler.

In general, a denitration catalyst such as a vanadium/titanium catalyst ($V_2O_5/TiO_2$) is used for denitration devices that remove nitrogen oxide from exhaust gas. The vanadium/titanium catalyst exhibits high catalytic activity in a high-temperature (e.g., about 370° C.) environment. Therefore, such a denitration device is disposed in an area near the outlet of exhaust gas in a boiler or on the upstream side of an exhaust line in, for example, a thermal power plant (e.g., refer to Patent Document 1).

Patent Document 1: Japanese Unexamined Patent Application, Publication No. 2011-190940

DISCLOSURE OF THE INVENTION

Problems to be Solved by the Invention

However, such an area near the outlet of exhaust gas in a boiler or on the upstream side of an exhaust line is in a high-temperature environment as described above and furthermore coal ash and S components are present in a high concentration, which readily deteriorates the denitration catalyst. If the denitration catalyst rapidly deteriorates, the denitration catalyst needs to be frequently replaced and thus the operation cost of the combustion system tends to increase.

In the case where nitrogen oxide is removed from exhaust gas by a selective catalytic reduction method in the denitration device, if the denitration catalyst deteriorates, ammonia used as a reducing agent leaks from the denitration device. If ammonia leaks from the denitration device, the ammonia and S components in the exhaust gas react with each other to generate ammonium sulfate. The ammonium sulfate adheres to an air preheater disposed downstream from the denitration device. When ammonium sulfate adheres to and deposits on the air preheater, for example, the air preheater needs to be cleaned to prevent clogging of a flow path of exhaust gas, which further increases the operation cost of the combustion system.

In view of the foregoing, it is an object of the present invention to provide a combustion system operated at low cost.

Means for Solving the Problems

The present invention relates to a combustion system including a combustion device that burns fuel, an exhaust line through which exhaust gas flows, the exhaust gas being generated through combustion of the fuel in the combustion device, a dust collector that is disposed in the exhaust line and that collects dust in the exhaust gas, and a denitration device that is disposed in the exhaust line and that removes nitrogen oxide from the exhaust gas using a denitration catalyst, wherein the denitration device is disposed downstream from the dust collector in the exhaust line, and the denitration catalyst contains 43 wt % or more of vanadium pentoxide and has a BET specific surface area of 30 m²/g or more.

The combustion system preferably further includes an air preheater that is disposed in the exhaust line and that recovers heat from the exhaust gas, wherein the air preheater is preferably disposed upstream from the dust collector.

In the denitration catalyst, an amount of $NH_3$ desorbed by $NH_3$-TPD (TPD: temperature programed desorption) is preferably 10.0 μmol/g or more.

The denitration device preferably removes nitrogen oxide from the exhaust gas by a selective catalytic reduction method.

The fuel is preferably coal.

Effects of the Invention

Since the denitration catalyst used for the denitration device does not readily deteriorate, a combustion system operated at low cost can be provided.

PREFERRED MODE FOR CARRYING OUT THE INVENTION

[First Embodiment]

Figure 1:
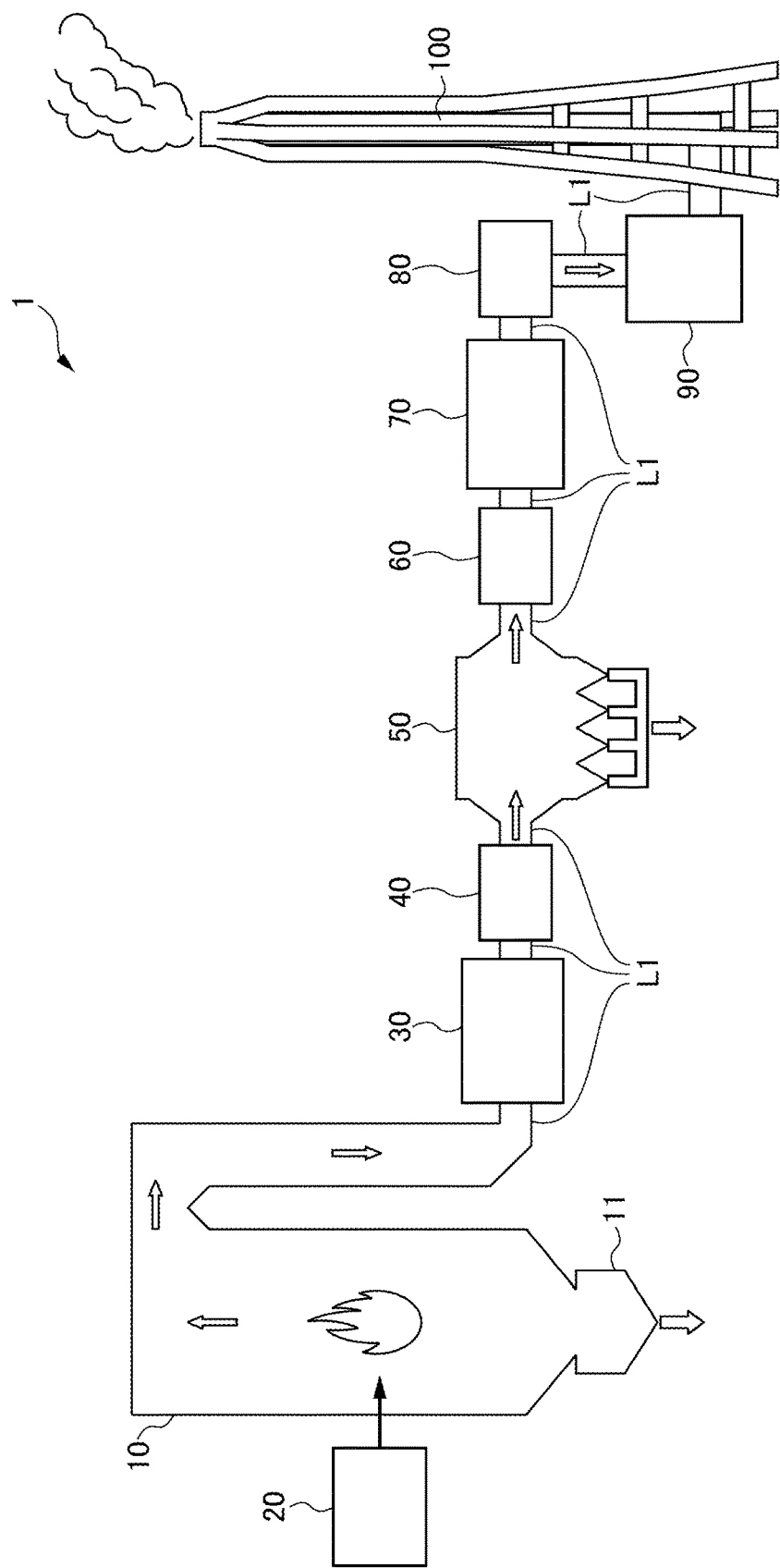
FIG. 1 illustrates a configuration of a combustion system according to a first embodiment of the present invention.

Hereafter, a first embodiment of the present invention will be described with reference to the attached drawings. FIG. 1 illustrates a configuration of a combustion system 1 according to this embodiment. As illustrated in FIG. 1, the combustion system 1 is assumed to be a thermal power generation system as an example and includes a boiler 10 serving as a combustion device, a coal pulverizer 20, an exhaust line D1, an air preheater 30, a gas heater 40 serving as a heat recovery unit, a dust collector 50, an induced draft fan 60, a desulfurization device 70, a gas heater 80 serving as a heater, a denitration device 90, and a smokestack 100.

The boiler 10 burns pulverized coal serving as fuel together with air. In the boiler 10, combustion of pulverized coal generates exhaust gas. Note that the combustion of pulverized coal generates coal ash such as clinker ash and fly ash. The clinker ash generated in the boiler 10 is discharged to a clinker hopper 11 disposed below the boiler 10 and then conveyed to a coal ash silo (not illustrated).

The boiler 10 has a substantially inverted U shape on the whole. The exhaust gas generated in the boiler 10 moves along the shape of the boiler 10 so as to draw an inverted U shape. The temperature of exhaust gas near the outlet of the boiler 10 is, for example, 300° C. to 400° C.

The coal pulverizer 20 pulverizes coal supplied from a coal bunker (not illustrated) and thus a pulverized coal having a small particle size is formed. The coal pulverizer 20 preheats and dries the pulverized coal by mixing the pulverized coal and air. The pulverized coal formed in the coal pulverizer 20 is supplied to the boiler 10 by blowing air on the pulverized coal.

The boiler 10 is connected to an upstream portion of the exhaust line L1. The exhaust line L1 is a flow pass through which the exhaust gas generated in the boiler 10 flows.

The air preheater 30 is disposed in the exhaust line L1. The air preheater 30 recovers heat from the exhaust gas by performing heat exchange between the exhaust gas and air for combustion that is sent from a forced draft fan (not illustrated). The air for combustion is heated in the air preheater 30 and then supplied to the boiler 10.

The gas heater 40 is disposed downstream from the air preheater 30 in the exhaust line L1. The exhaust gas that has been subjected to heat recovery in the air preheater 30 is supplied to the gas heater 40. The gas heater 40 further recovers heat from the exhaust gas.

The dust collector 50 is disposed downstream from the gas heater 40 in the exhaust line L1. The exhaust gas that has been subjected to heat recovery in the gas heater 40 is supplied to the dust collector 50. The dust collector 50 is a device that collects dust such as coal ash (fly ash) in the exhaust gas by applying voltage to electrodes. Fly ash collected in the dust collector 50 is conveyed to a coal ash salvage silo (not illustrated). The temperature of the exhaust gas in the dust collector 50 is, for example, 80° C. to 120° C.

The induced draft fan 60 is disposed downstream from the electric dust collector 50 in the exhaust line L1. In the induced draft fan 60, the exhaust gas from which the fly ash has been removed in the electric dust collector 50 is taken in from the upstream side and sent out to the downstream side.

The desulfurization device 70 is disposed downstream from the induced draft fan 60 in the exhaust line L1. The exhaust gas sent out from the induced draft fan 60 is supplied to the desulfurization device 70. The desulfurization device 70 removes sulfur oxide from the exhaust gas. Specifically, the desulfurization device 70 removes sulfur oxide from the exhaust gas by spraying a mixed liquid (limestone slurry) of limestone and water onto the exhaust gas to cause absorption of the sulfur oxide contained in the exhaust gas into the mixed liquid. The temperature of the exhaust gas in the desulfurization device 70 is, for example, 50° C. to 120° C.

The gas heater 80 is disposed downstream from the desulfurization device 70 in the exhaust line L1. The exhaust gas from which sulfur oxide has been removed in the desulfurization device 70 is supplied to the gas heater 80. The gas heater 80 heats the exhaust gas. The gas heater 40 and the gas heater 80 may serve as a gas-gas heater that performs heat exchange between the exhaust gas that flows between the air preheater 30 and the electric dust collector 50 and the exhaust gas that flows between the desulfurization device 70 and a denitration device 90 described below in the exhaust line L1.

The denitration device 90 is disposed downstream from the gas heater 80 in the exhaust line L1. The exhaust gas that has been heated in the gas heater 80 is supplied to the denitration device 90. The denitration device 90 removes nitrogen oxide from the exhaust gas using a denitration catalyst. The denitration catalyst used in the denitration device 90 will be specifically described later. The temperature of the exhaust gas in the denitration device 90 is, for example, 130° C. to 200° C.

In the denitration device 90, nitrogen oxide is removed from the exhaust gas by a selective catalytic reduction method. In the selective catalytic reduction method, nitrogen and water are generated from nitrogen oxide by using a reducing agent and a denitration catalyst. Thus, nitrogen oxide can be efficiently removed from the exhaust gas. The reducing agent used in the selective catalytic reduction method contains at least one of ammonia and urea. When ammonia is used as a reducing agent, ammonia in any state, such as ammonia gas, liquid ammonia, or an aqueous ammonia solution, may be used.

More specifically, the denitration device 90 may have the following mechanism. Ammonia gas is injected to the introduced exhaust gas and then the mixed gas is brought into contact with the denitration catalyst.

The smokestack 100 is connected to a downstream portion of the exhaust line L1. The exhaust gas from which nitrogen oxide has been removed in the denitration device 90 is introduced into the smokestack 100. The exhaust gas introduced into the smokestack 100 is heated in the gas heater 80 and thus is effectively discharged from the upper part of the smokestack 100 because of a stack effect. Furthermore, since the exhaust gas is heated in the gas heater 80, the generation of white smoke due to condensation of water vapor can be prevented above the smokestack 100. The temperature of the exhaust gas near the outlet of the smokestack 100 is, for example, 110° C.

Next, the denitration catalyst used in the denitration device 90 will be described. The denitration catalyst of the present invention contains 43 wt % or more of vanadium pentoxide, and the catalyst component has a BET specific surface area of 30 m$^2$/g or more. Such a denitration catalyst can exhibit a high denitration effect even in a low-temperature environment compared with known denitration catalysts such as a vanadium/titanium catalyst.

Specifically, when a denitration catalyst containing 3.3 wt % or more of vanadium oxide in terms of vanadium pentoxide is used in a selective catalytic reduction reaction (NH$_3$-SCR) that uses ammonia as a reducing agent, the NO conversion ratio is approximately 35% or more at a reaction temperature of 120° C. and approximately 60% or more at a reaction temperature of 150° C. Even at a reaction temperature of 100° C., the NO conversion ratio exceeds 20%. In contrast, if the denitration catalyst contains only less than 3.3 wt % of vanadium oxide in terms of vanadium pentoxide, the NO conversion ratio is less than 20% at a reaction temperature of 120° C. and even at a reaction temperature of 150° C.

As described above, the denitration catalyst according to the present invention contains 43 wt % or more of vanadium oxide in terms of vanadium pentoxide, and may also contain titanium oxide as another component in addition to the vanadium oxide. Furthermore, a noble metal, a base metal, and a main group metal may be contained. Preferably, for example, tungsten oxide, chromium oxide, and molybdenum oxide can also be contained.

It has been described that the denitration catalyst preferably contains 43 wt % or more of vanadium oxide in terms of vanadium pentoxide. Preferably, the denitration catalyst may contain 80 wt % or more of vanadium oxide in terms of vanadium pentoxide. More preferably, the content of vanadium oxide in the denitration catalyst may be 100%.

The above-described vanadium oxide includes vanadium (II) oxide (VO), vanadium(III) trioxide ($V_2O_3$), vanadium (IV) dioxide ($V_2O_4$), and vanadium(V) pentoxide ($V_2O_5$), and the V element in vanadium pentoxide ($V_2O_5$) may have a pentavalent, tetravalent, trivalent, or divalent form in the denitration reaction.

Regarding the BET specific surface area of the denitration catalyst, for example, in the NH$_3$-SCR that is performed at a reaction temperature of 120° C. using a denitration catalyst containing vanadium pentoxide and having a BET specific surface area of 13.5 m$^2$/g, the NO conversion ratio exceeds 20%. Even in the NH$_3$-SCR that is performed at a reaction temperature of 120° C. using a denitration catalyst containing vanadium pentoxide and having a BET specific surface area of 16.6 m$^2$/g, the NO conversion ratio exceeds 20%. In contrast, in the NH$_3$-SCR that is performed at a reaction temperature of 120° C. using, for example, a denitration catalyst having a BET specific surface area of 4.68 m$^2$/g, which is a denitration catalyst having a BET specific surface area of less than 10 m$^2$/g, the NO conversion ratio falls below 20%.

The BET specific surface area of the denitration catalyst is 10 m$^2$/g or more and may be preferably 15 m$^2$/g or more. More preferably, the BET specific surface area of the denitration catalyst may be 30 m$^2$/g. More preferably, the BET specific surface area of the denitration catalyst may be 40 m$^2$/g or more. More preferably, the BET specific surface area of the denitration catalyst may be 50 m$^2$/g or more. More preferably, the BET specific surface area of the denitration catalyst may be 60 m$^2$/g or more.

The BET specific surface area of the denitration catalyst is preferably measured in conformity with the conditions specified in JIS Z 8830:2013. Specifically, the BET specific surface area can be measured by a method described in Examples below.

The denitration catalyst of the present invention is used for denitration at 200° C. or lower. Preferably, the denitration catalyst is used for denitration at 160° C. or higher and 200° C. or lower. Thus, oxidation of SO$_2$ into SO$_3$ does not occur during the NH$_3$-SCR reaction.

Regarding the amount of NH$_3$ desorbed by NH$_3$-TPD (TPD: temperature programed desorption), when the amount of NH$_3$ desorbed exceeds 10.0 μmol/g, the NO conversion ratio of the denitration catalyst in the NH$_3$-SCR at a reaction temperature of 120° C. is 20% or more. In contrast, when the amount of NH$_3$ desorbed falls below 10.0 μmol/g, the NO conversion ratio of the denitration catalyst in the NH$_3$-SCR at a reaction temperature of 120° C. falls below 20%.

In the denitration catalyst of the present invention, the amount of NH$_3$ desorbed by NH$_3$-TPD (TPD: temperature programed desorption) is 10.0 μmol/q or more. Preferably, the amount of NH$_3$ desorbed by NH$_3$-TPD may be 20.0 μmol/g or more. More preferably, the amount of NH$_3$ desorbed by NH$_3$-TPD may be 50.0 μmol/g or more. More preferably, the amount of NH$_3$ desorbed by NH$_3$-TPD may be 70.0 μmol/g or more.

The denitration catalyst containing 3.3 wt % or more of vanadium oxide in terms of vanadium pentoxide and having a BET specific surface area of 10 m$^2$/g or more can be produced by any of a thermal decomposition process, a sol-gel process, and an impregnation process. Hereafter, a method for producing the denitration catalyst containing 3.3 wt % or more of vanadium pentoxide and having a specific surface area of 10 m$^2$/g or more by a thermal decomposition process, a sol-gel process, or an impregnation process will be described.

The thermal decomposition process includes a step of thermally decomposing a vanadate. Examples of the vanadate that may be used include ammonium vanadate, magnesium vanadate, strontium vanadate, barium vanadate, zinc vanadate, tin vanadate, and lithium vanadate.

In the thermal decomposition process, the vanadate is preferably thermally decomposed at 300° C. to 400° C.

The sol-gel process includes a step of dissolving a vanadate in a chelate compound, performing drying, and performing firing. Examples of the chelate compound that may be used include compounds having a plurality of carboxy groups, such as oxalic acid and citric acid; compounds having a plurality of amino groups, such as acetylacetonate and ethylenediamine; and compounds having a plurality of hydroxy groups, such as ethylene glycol.

The sol-gel process preferably includes a step of dissolving a vanadate in a chelate compound such that the molar ratio of vanadium and the chelate compound is, for example, 1:1 to 1:5, though this is dependent on the chelate compound. Preferably, the molar ratio of the vanadate and the chelate compound may be 1:2 to 1:4.

The impregnation process includes a step of dissolving a vanadate in a chelate compound, adding a carrier, performing drying, and then performing firing. Examples of the carrier that may be used include titanium oxide, aluminum oxide, and silica. As above, examples of the chelate compound that may be used include compounds having a plurality of carboxy groups, such as oxalic acid and citric acid; compounds having a plurality of amino groups, such as acetylacetonate and ethylenediamine; and compounds having a plurality of hydroxy groups, such as ethylene glycol.

In the impregnation process, xwt % $V_2O_5/TiO_2$ (x≥43) may be produced as a denitration catalyst according to an embodiment of the present invention by, for example, dissolving ammonium vanadate in an oxalic acid solution, adding titanium oxide ($TiO_2$) serving as a carrier, performing drying, and then performing firing.

The thus-produced denitration catalyst normally contains 3.3 wt % or more of vanadium pentoxide and has a specific surface area of 10 $m^2$/g or more.

Form of the denitration catalyst is preferably a honeycomb-type catalyst obtained by coating a honeycomb-shaped substrate with a powder of the above denitration catalyst or a catalyst obtained by baking the above denitration catalyst serving as a catalyst component in a block shape.

The combustion system 1 according to the above embodiment produces the following effects.

(1) In the combustion system 1 according to the above embodiment, the denitration device 90 is disposed downstream from the dust collector 50 in the exhaust line L1 through which the exhaust gas generated in the boiler (combustion device) 10 flows. Furthermore, in the above embodiment, the denitration catalyst containing 43 wt % or more of vanadium pentoxide and having a BET specific surface area of 30 $m^2$/g or more is used in the denitration device 90. Since the denitration catalyst in the above embodiment can be used for denitration at 200° C. or lower, the denitration device 90 can be disposed downstream from the dust collector 50. Thus, a relatively clean exhaust gas containing only a small amount of ash is introduced into the denitration device 90, which can suppress the deterioration of the denitration catalyst.

(2) The combustion system 1 according to the above embodiment further includes the air preheater 30 that recovers heat from the exhaust gas and the air preheater 30 is disposed upstream from the dust collector 50. The exhaust gas subjected to heat recovery in the air preheater 30 is supplied to the dust collector 50, which reduces the load on the dust collector 50 due to heat of the exhaust gas. Furthermore, the denitration device 90 is not disposed upstream from the air preheater 30 that is normally disposed near the boiler (combustion device) 10 in the exhaust line L1. This does not cause clogging of the air preheater 30 due to ammonium sulfate generated as a result of reaction between ammonia and a S component in the exhaust gas. Thus, the combustion system 1 is operated at low cost.

(3) As described above, in the denitration catalyst used in the denitration device 90, the amount of $NH_3$ desorbed by $NH_3$-TPD (TPD: temperature programed desorption) is preferably 10.0 μmol/g or more. Thus, when the denitration catalyst is used in $NH_3$-SCR at a reaction temperature of 120° C., the NO conversion ratio exceeds 20%.

(4) In the above embodiment, the denitration device 90 removes nitrogen oxide from the exhaust gas by a selective catalytic reduction method. In the case where nitrogen oxide is removed from the exhaust gas by a selective catalytic reduction method in the denitration device 90, if the denitration catalyst deteriorates, ammonia (or urea) used as a reducing agent leaks from the denitration device 90. As described above, the denitration device 90 is not disposed upstream from the air preheater 30 that is normally disposed near the boiler 10 in the exhaust line L1. This does not cause clogging of the air preheater 30 due to ammonium sulfate generated as a result of reaction between ammonia and a S component in the exhaust gas. Since the clogging of the air preheater 30 is prevented in such a manner, the cost for cleaning the air preheater 30 can be reduced. In the above embodiment, the S component is sufficiently removed from the exhaust gas in the desulfurization device 70. Therefore, even if ammonia leaks from the denitration device 90, ammonium sulfate is not easily generated.

(5) In the combustion system 1 according to the above embodiment, the fuel burned in the boiler (combustion device) 10 is coal. When coal is burned in a boiler of a thermal power generation system, the concentrations of sulfur oxide and nitrogen oxide in exhaust gas tend to increase, which readily deteriorates the denitration catalyst. In the thermal power generation system 1 according to the above embodiment, even if coal is burned in the boiler 10, the deterioration of the denitration catalyst in the denitration device 90 can be suppressed.

Figure 2:
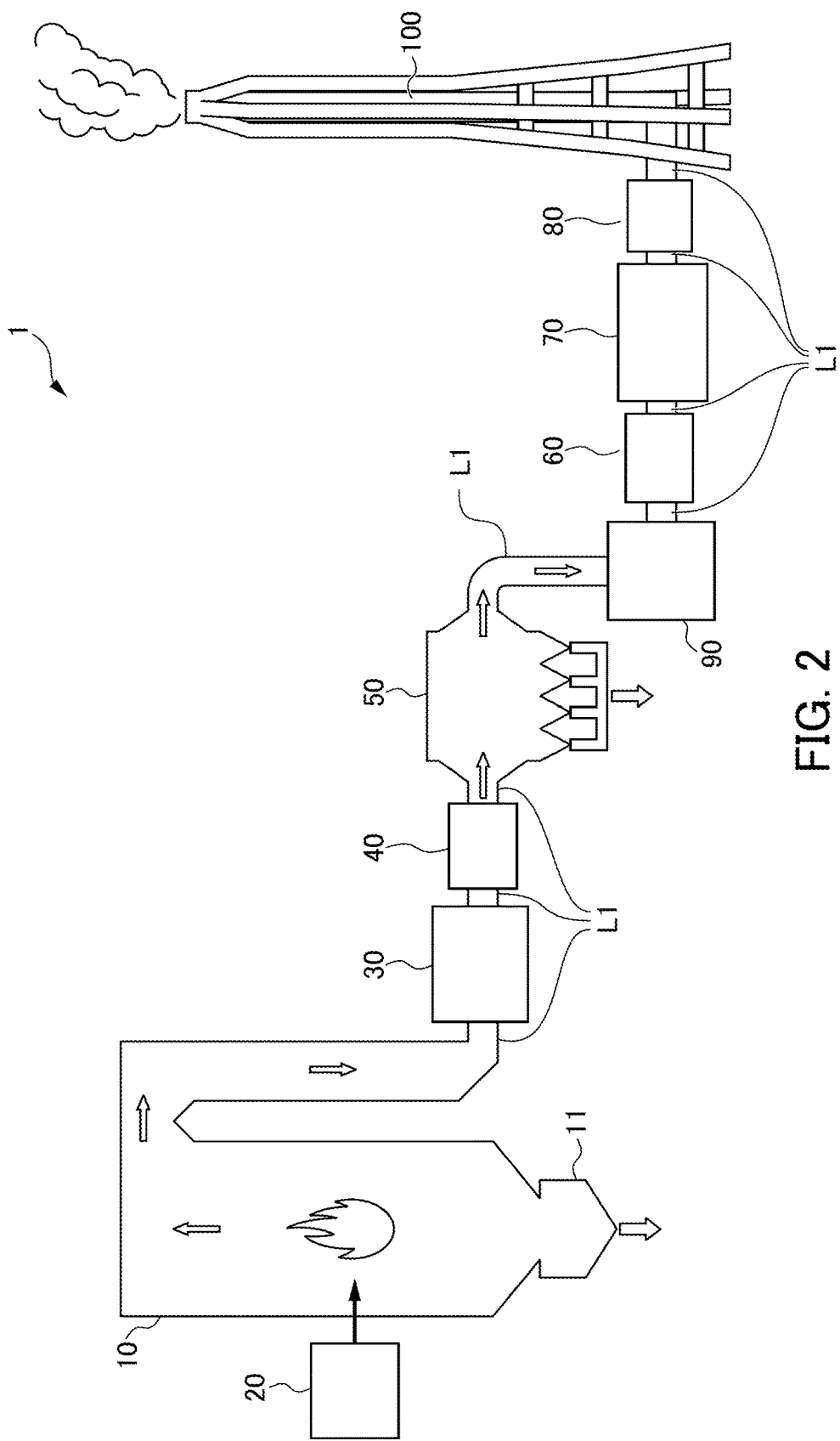
FIG. 2 illustrates a configuration of a combustion system according to a second embodiment of the present invention.

Hereafter, a second embodiment of the present invention will be described with reference to the attached drawings. FIG. 2 illustrates a configuration of a combustion system 1A according to this embodiment. In the thermal power generation system 1A, the same constituent elements as those of the combustion system 1 according to the first embodiment will be denoted by the same numerals, and the descriptions of the functions will be omitted.

The combustion system 1A is different from the combustion system 1 according to the first embodiment in that the denitration device 90 is disposed immediately after the dust collector 50. Furthermore, the induced draft fan 60, the desulfurization device 70, and the gas heater 80 are provided downstream from the denitration device 90 in this order.

When the denitration device 90 is disposed immediately after the dust collector 50, a gas heater is not necessarily disposed upstream from the denitration device 90. Thus, the temperature of the exhaust gas in the denitration device 90 can be set to 130° C. to 200° C.

The combustion system 1A according to the above embodiment produces the following effect in addition to the same effects as those produced by the combustion system 1.

(6) In the combustion system 1A, the denitration device 90 is disposed immediately after the dust collector 50. Therefore, a relatively clean exhaust gas containing a smaller amount of ash than that of the combustion system 1 according to the first embodiment is introduced into the denitration device 90. This can suppress the deterioration of the denitration catalyst.

The present invention is not limited to the above embodiment, and any of modifications, improvements, and the like are included in the present invention as long as the object of the present invention is achieved.

It has been described in the above embodiment that the denitration device 90 removes nitrogen oxide from the exhaust gas by a selective catalytic reduction method. However, the present invention is not limited thereto. For example, in the present invention, the denitration device 90 may remove nitrogen oxide from the exhaust gas by a non-selective catalytic reduction method.

It has been described in the above embodiment that the denitration device 90 is disposed downstream from the gas heater 80. However, the present invention is not limited thereto. The denitration device 90 may be disposed at any position downstream from the dust collector 50. After the exhaust gas is reheated using a gas-gas heater, denitration may be performed using the denitration device 90.

EXAMPLES

Hereafter, Examples of the catalyst component of the present invention will be specifically described together with Reference Examples and Comparative Examples. The present invention is not limited by Examples.
1. Relationship Between Vanadium Oxide Content and Specific Surface Area and $NH_3$-SCR Activity
1.1 Examples and Comparative Examples Reference Example 1

Ammonium vanadate ($NH_4VO_3$) was thermally decomposed in the air at 300° C. for 4 hours to obtain vanadium pentoxide ($V_2O_5$). The obtained vanadium pentoxide was used as a denitration catalyst in Reference Example 1. The sample name of the denitration catalyst in Reference Example 1 was "$V_2O_5$_300".

Reference Example 2

Ammonium vanadate was thermally decomposed in the air at 400° C. for 4 hours to obtain vanadium pentoxide. The obtained vanadium pentoxide was used as a denitration catalyst in Reference Example 2. The sample name of the denitration catalyst in Reference Example 2 was "$V_2O_5$_400".

Comparative Example 1

Ammonium vanadate was thermally decomposed in the air at 500° C. for 4 hours to obtain vanadium pentoxide. The obtained vanadium pentoxide was used as a denitration catalyst in Comparative Example 1. The sample name of the denitration catalyst in Comparative Example 1 was "$V_2O_5$_500".

Example 1

Ammonium vanadate was dissolved in an oxalic acid solution (molar ratio of vanadium:oxalic acid=1:3). After ammonium vanadate was completely dissolved, water in the solution was evaporated on a hot stirrer, and drying was performed in a dryer at 120° C. for one night. Then, the dried powder was fired in the air at 300° C. for 4 hours. The vanadium pentoxide after firing was used as a denitration catalyst in Example 1. The sample name of the denitration catalyst in Example 1 obtained by this sol-gel process was "$V_2O_5$_SG_300". Denitration catalysts obtained at different molar ratios of vanadium and oxalic acid when ammonium vanadate is dissolved in an oxalic acid solution will be described later.

Comparative Example 2

Ammonium vanadate was added to an oxalic acid solution and stirred for 10 minutes, and titanium oxide serving as a carrier was gradually added. Then, water in the solution was evaporated on a hot stirrer and drying was performed in a dryer at 120° C. for one night. Subsequently, the dried powder was fired in the air at 300° C. for 4 hours. As a result, the denitration catalyst after firing that contained 0.3 wt % of vanadium pentoxide was used as a denitration catalyst in Comparative Example 2. The sample name of the denitration catalyst in Comparative Example 2 was "0.3 wt % $V_2O_5$/$TiO_2$".

Comparative Example 3

The denitration catalyst after firing that was obtained by the same method as in Comparative Example 2 and contained 0.9 wt % of vanadium pentoxide was used as a denitration catalyst in Comparative Example 3. The sample name of the denitration catalyst in Comparative Example 3 was "0.9 wt % $V_2O_5$/$TiO_2$".

Reference Example 3

The denitration catalyst after firing that was obtained by the same method as in Comparative Example 2 and contained 3.3 wt % of vanadium pentoxide was used as a denitration catalyst in Reference Example 3. The sample name of the denitration catalyst in Reference Example 3 was "3.3 wt % $V_2O_5$/$TiO_2$".

Reference Example 4

The denitration catalyst after firing that was obtained by the same method as in Comparative Example 2 and contained 9 wt % of vanadium pentoxide was used as a denitration catalyst in Reference Example 4. The sample name of the denitration catalyst in Reference Example 4 was "9 wt % $V_2O_5$/$TiO_2$".

Reference Example 5

The denitration catalyst after firing that was obtained by the same method as in Comparative Example 2 and contained 20 wt % of vanadium pentoxide was used as a denitration catalyst in Reference Example 5. The sample name of the denitration catalyst in Reference Example 5 was "20 wt % $V_2O_5$/$TiO_2$".

Reference Example 6

The denitration catalyst after firing that was obtained by the same method as in Comparative Example 2 and contained 33 wt % of vanadium pentoxide was used as a denitration catalyst in Reference Example 6. The sample name of the denitration catalyst in Reference Example 6 was "33 wt % $V_2O_5$/$TiO_2$".

Example 2

The denitration catalyst after firing that was obtained by the same method as in Comparative Example 2 and contained 43 wt % of vanadium pentoxide was used as a denitration catalyst in Example 2. The sample name of the denitration catalyst in Example 2 was "43 wt % $V_2O_5$/$TiO_2$".

Example 3

The denitration catalyst after firing that was obtained by the same method as in Comparative Example 2 and contained 80 wt % of vanadium pentoxide was used as a denitration catalyst in Example 3. The sample name of the denitration catalyst in Example 3 was "80 wt % $V_2O_5/TiO_2$".

Comparative Example 4

An existing catalyst was used in Comparative Example 4. The existing catalyst is a catalyst in which, for example, tungsten oxide ($WO_3$) (content: 10.72 wt %) and silica ($SiO_2$) (content: 6.25 wt %) are supported on titanium oxide ($TiO_2$) (content: 79.67 wt %) and which contains about 0.5% of vanadium.

1.2 Evaluation 1.2.1 Powder X-Ray Diffraction (Diffraction Method)

Powder X-ray diffraction analysis was performed with a Rigaku smart lab using Cu-hα.

(Diffraction Result)

Figure 3:
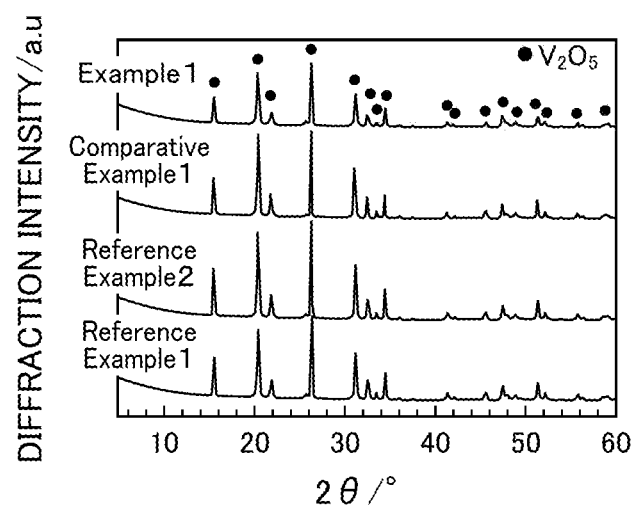
FIG. 3 illustrates the powder X-ray diffraction results of vanadium pentoxide catalysts produced in Example 1, Reference Examples 1 and 2, and Comparative Example 1.
Figure 4:
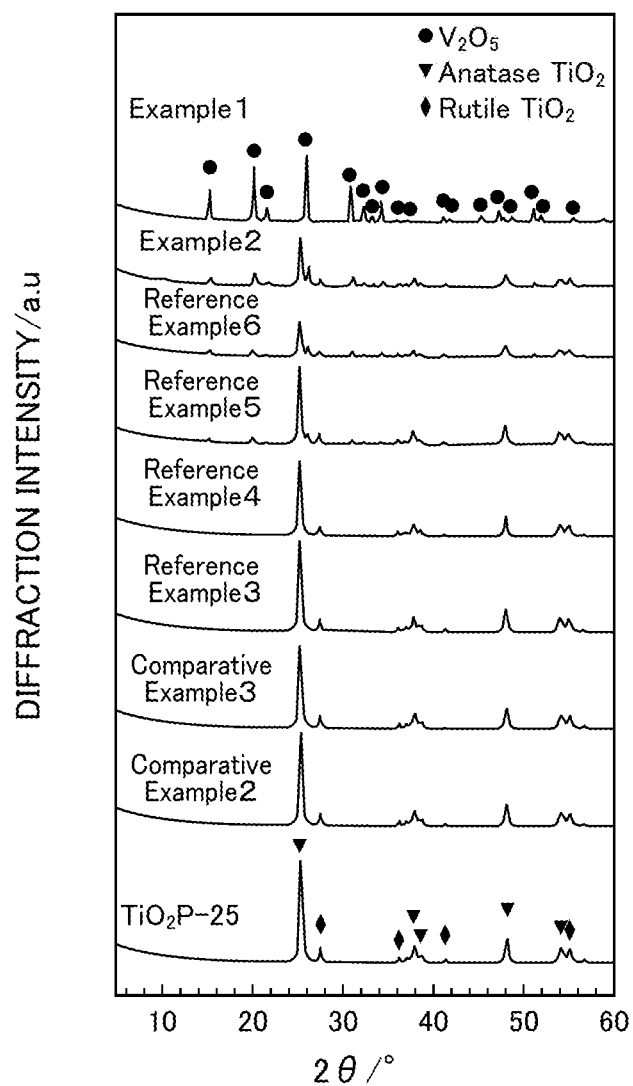
FIG. 4 illustrates the powder X-ray diffraction results of vanadium pentoxide catalysts produced in Examples 1 and 2, Reference Examples 3 to 6, and Comparative Examples 2 and 3.

FIG. 3 illustrates powder XRD patterns of Example 1 ($V_2O_5\_SG\_300$), Reference Example 1 ($V_2O_5\_300$), Reference Example 2 ($V_2O_5\_0.400$), and Comparative Example 1 ($V_2O_5\_500$). FIG. 4 illustrates powder XRD patterns of Example 1 ($V_2O_5\_SG\_300$) and Example 2, Reference Examples 3 to 6, and Comparative Examples 2 and 3 (xwt % $V_2O_5/TiO_2$) In the powder XRD patterns of Example 1 ($V_2O_5\_SG\_300$), Reference Example 1 ($V_2O_5\_300$), Reference Example 2 ($V_2O_5\_400$), and Comparative Example 1 ($V_2O_5\_500$), only peaks for $V_2O_5$ were observed regardless of the thermal decomposition temperature and the production method. In the powder XRD patterns of Example 2, Reference Examples 3 to 6, and Comparative Examples 2 and 3 (xwt % $V_2O_5/TiO_2$, peaks for $V_2O_5$ were not observed at 9 wt % or less and thus $V_2O_5$ is believed to be highly dispersed in $TiO_2$. When the amount of $V_2O_5$ supported was increased to 20 wt %, peaks for $V_2O_5$ were observed at 22.2° and 27.4°, and the $V_2O_5$ peak intensity increased as the amount of $V_2O_5$ supported was increased. On the other hand, the $TiO_2$ peak intensity tended to decrease.

1.2.2 Measurement of BET Specific Surface Area (Measurement Method)

The BET specific surface area was measured with a MicrotracBEL BELSORP-max. Pretreatment was performed in an Ar atmosphere at 200° C. for 2 hours, and then measurement was performed at 196° C.

(Measurement Result)

TABLE 1

BET specific surface area of vanadium pentoxide catalyst

| Sample | | BET specific surface area/$m^2g^{-1}$ |
|---|---|---|
| Reference Example1 | ($V_2O_5\_300$) | 16.6 |
| Reference Example2 | ($V_2O_5\_400$) | 13.5 |
| Comparative Example1 | ($V_2O_5\_500$) | 4.68 |
| Example1 | ($V_2O_5\_SG\_300$) | 62.9 |
| Comparative Example2 | (0.3 wt % $V_2O_5/TiO_2$) | 62.8 |
| Comparative Example3 | (0.9 wt % $V_2O_5/TiO_2$) | 59 |
| Reference Example3 | (3.3 wt % $V_2O_5/TiO_2$) | 55.4 |
| Reference Example4 | (9 wt % $V_2O_5/TiO_2$) | 54.6 |
| Reference Example5 | (20 wt % $V_2O_5/TiO_2$) | 48.3 |
| Reference Example6 | (33 wt % $V_2O_5/TiO_2$) | 41.2 |
| Example2 | (43 wt % $V_2O_5/TiO_2$) | 49.4 |
| Example3 | (80 wt % $V_2O_5/TiO_2$) | 34 |
| Comparative Example4 | (Existing catalyst) | 61.8 |

Table 1 shows BET specific surface areas of Reference Example 1 ($V_2O_5\_300$), Reference Example 2 ($V_2O_5\_400$), Comparative Example 1 ($V_2O_5\_500$), Example 1 ($V_2O_5\_SG\_300$), Comparative Examples 2 and 3, Reference Examples 3 to 6, and Examples 2 and 3 (xwt % $V_2O_5/TiO_2$ catalyst), and Comparative Example 4 (existing catalyst). In the vanadium pentoxide catalysts obtained by thermally decomposing ammonium vanadate, the BET specific surface area decreased with increasing the thermal decomposition temperature. That is, the vanadium pentoxide in Reference Example 1 ($V_2O_5\_300$) in which the thermal decomposition was performed at 300° C. had a maximum BET specific surface area of 16.6 $m^2g^{-1}$. The vanadium pentoxide obtained at 300° C. through a sol-gel process had a larger BET specific surface area of 62.9 $m^2g^{-1}$. In Reference Examples 3 to 6, Examples 2 and 3, and Comparative Examples 2 and 3 (xwt % $V_2O_5/TiO_2$), as the amount of vanadium pentoxide supported was increased, pores in $TiO_2$ were filled and the BET specific surface area decreased.

1.2.3 Measurement of Catalytic Activity (Measurement Method)

An $NH_3$-SCR reaction was performed using a fixed-bed flow reactor under the conditions listed in Table 2 below. Among gases that had passed through the catalytic layer, NO, $NH_3$, $NO_2$, and $N_2O$ were analyzed with a Jasco FT-IR-4700.

TABLE 2

$NH_3$-SCR measurement conditions

| | |
|---|---|
| Amount of catalyst | 0.375 mg |
| Gas flow rate | 250 mLmin$^{-1}$ |
| | (NO: 250 ppm, $NH_3$: 250 ppm, $O_2$: 4 vol %) |
| | (2000 ppm NO/Ar 31.3 mL min$^{-1}$) |
| | (2000 ppm $NH_3$/Ar 31.3 mL min$^{-1}$) |
| | ($O_2$ 14 mL min$^{-1}$) |
| | (Ar 177.4 mL min$^{-1}$) |
| Space velocity | 40,000 mLh$^{-1}g_{cat}^{-1}$ |

Furthermore, the NO conversion ratio and the $N_2$ selectivity were calculated from formulae below. Herein, $NO_{in}$ represents a NO concentration at an inlet of a reaction tube, $NO_{out}$ represents a NO concentration at an outlet of the reaction tube, $N_{2out}$ represents a $N_2$ concentration at the outlet or the reaction tube, $NH_{3in}$ represents an $NH_{3out}$ concentration at the inlet of the reaction tube, and $NH_{3out}$ represents an $NH_3$ concentration at the outlet of the reaction tube.

$$\text{NO CONVERSATION RATIO} = \frac{NO_{in} - NO_{out}}{NO_{in}} \times 100 \quad \text{[Formula 1]}$$

$$N_2 \text{ SELECTIVITY } (\%) = \frac{2*N_{2out}}{(NO_{in} + NH_{3in}) - (NO_{out} - NH_{3out})} \times 100 \quad \text{[Formula 2]}$$

$(2*N_{2out} = (NO_{in} + NH_{3in}) - (NO_{out} + NH_{3out} + NO_{2out} + 2*N_2O_{out}))$ (Measurement Result)

Figure 5:
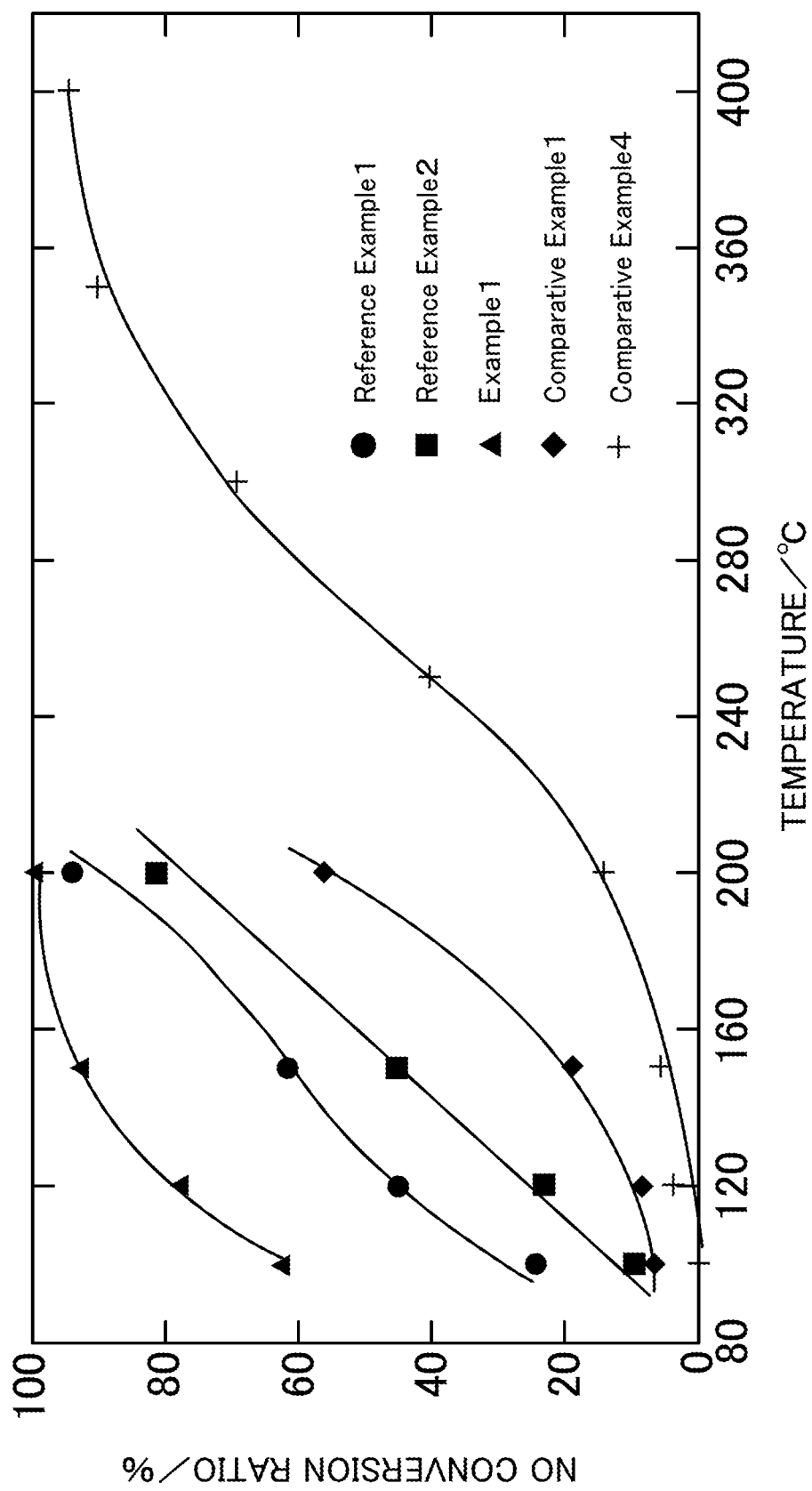
FIG. 5 illustrates the $NH_3$-SCR activity of vanadium pentoxide catalysts produced in Example 1, Reference Examples 1 and 2, and Comparative Examples 1 and 4.

FIG. 5 illustrates the $NH_3$-SCR activity of the vanadium pentoxide catalysts. In the case of the catalysts obtained by thermally decomposing ammonium vanadate, the NO conversion ratio increased as the thermal decomposition temperature was decreased. The highest activity was exhibited in Reference Example 1 ($V_2O_5\_300°$ C.) in which the catalyst was obtained at a thermal decomposition temperature of 300° C. At a reaction temperature of 200° C., a NO conversion ratio of 80% or more was achieved when any of the catalysts in Reference Example 1 ($V_2O_5\_300°$ C.), Reference Example 2 ($V_2O_5\_400°$ C.), and Example 1

($V_2O_5\_SG\_300°$ C.) was used. Furthermore, the NO conversion ratio was higher in any of Examples than in Comparative Example 1 and Comparative Example 4.

The specific surface area of the vanadium pentoxide increases as the thermal decomposition temperature is decreased. Therefore, it is believed that the low-temperature $NH_3$-SCR activity that uses a bulk vanadium pentoxide catalyst is attributable to the BET specific surface area. Hence, as described above, the vanadium pentoxide was produced through a sol-gel process that uses oxalic acid in order to increase the BET specific surface area in Example 1. The BET specific surface area of the vanadium pentoxide produced through this process is 62.9 $m^2g^{-1}$ as shown in Table 1, which is about four times larger than the BET specific surface areas of the vanadium pentoxides produced through a thermal decomposition process. The NO conversion ratio in Example 1 ($V_2O_5\_SG\_300°$ C.) was increased by 80% to 200% at 100° C. to 150° C. compared with the vanadium pentoxides produced through a thermal decomposition process.

Figure 6:
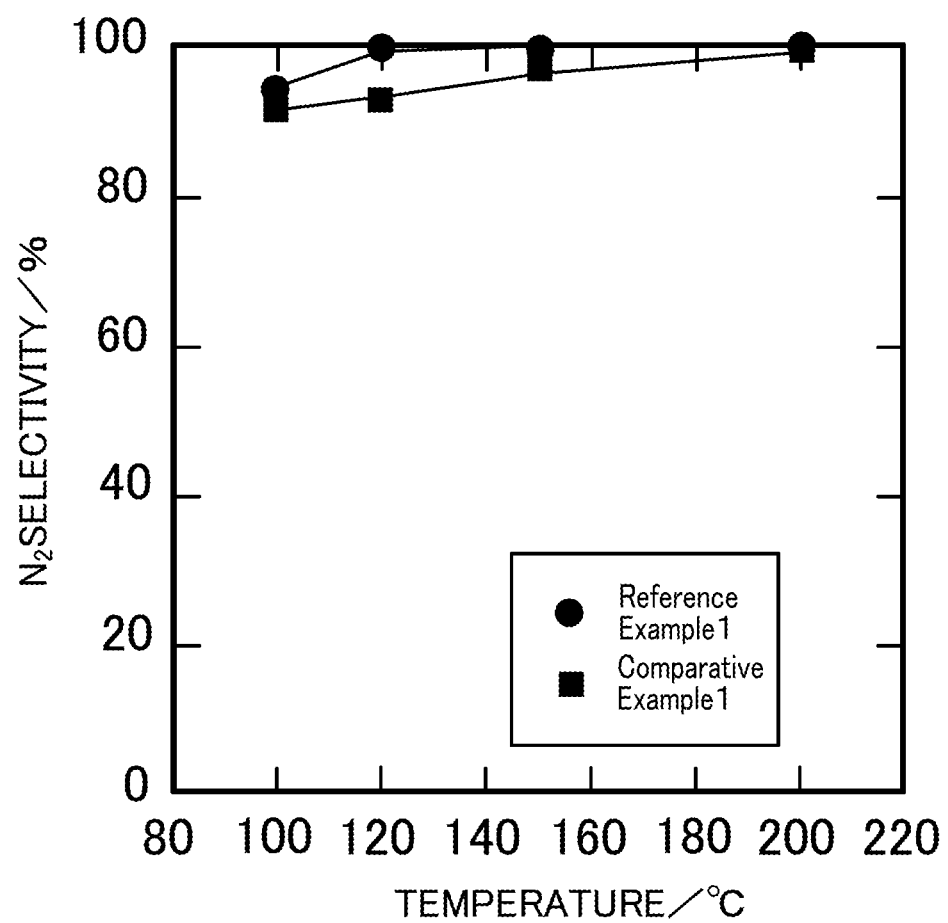
FIG. 6 illustrates the relationship between the reaction temperature and the $N_2$ selectivity in a selective catalytic reduction reaction that uses vanadium pentoxide catalysts produced in Reference Example 1 and Comparative Example 1.

The $N_2$ selectivity was almost 100% at any temperature. FIG. 6 illustrates, as examples, the $N_2$ selectivities in Reference Example 1 ($V_2O_5\_300°$ C.) and Comparative Example 1 ($V_2O_5\_300°$ C.).

(Space Velocity Dependency)

Figure 7:
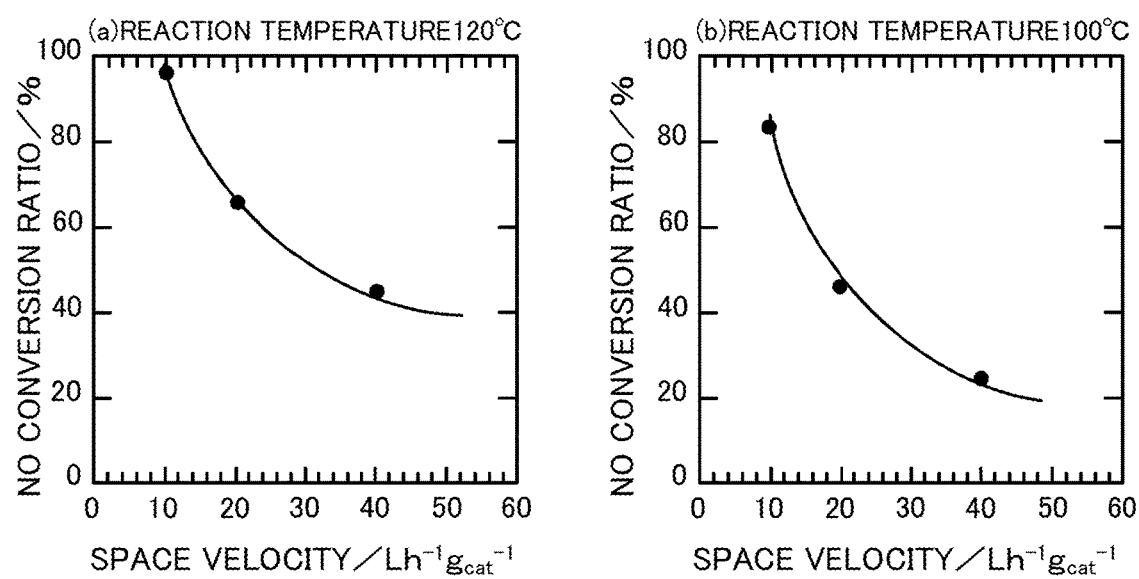
FIG. 7 illustrates the space velocity dependency in the case where a vanadium pentoxide catalyst produced in Reference Example 1 is used in an $NH_3$-SCR reaction.

In the case where the catalyst in Reference Example 1 ($V_2O_5\_300°$ C.) was used, the space velocity (for gas treatment) dependency was measured by performing the selective catalytic reduction reaction under the conditions listed in Table 3 below. FIG. 7 illustrates the measurement results. FIG. 7(a) illustrates the NO conversion ratio at a reaction temperature of 120° C. FIG. 7(b) illustrates the NO conversion ratio at a reaction temperature of 100° C. The 80% NO detoxification was about 15 $Lh^{-1}g_{cat}^{-1}$ at 120° C. and about 11 $Lh^{-1}g_{cat}^{-1}$ at 100° C. In an experiment in which the space velocity was changed, the $N_2$ selectivity was almost 100%.

TABLE 3

$NH_3$-SCR measurement conditions

| | |
|---|---|
| Reaction temperature | 120 or 100° C. |
| Amount of catalyst | 0.375 g, 0.750 g, 1.5 g |
| Total gas flow rate | 250 mLmin$^{-1}$ |
| | (NO: 250 ppm, $NH_3$: 250 ppm, |
| | $O_2$: 4 vol %, Ar balance) |
| Space velocity | 10-40 $Lh^{-1}g_{cat}^{-1}$ |
| Gas flow time | 0.5 h |

(Reaction in Coexistence with Water)

Figure 8:
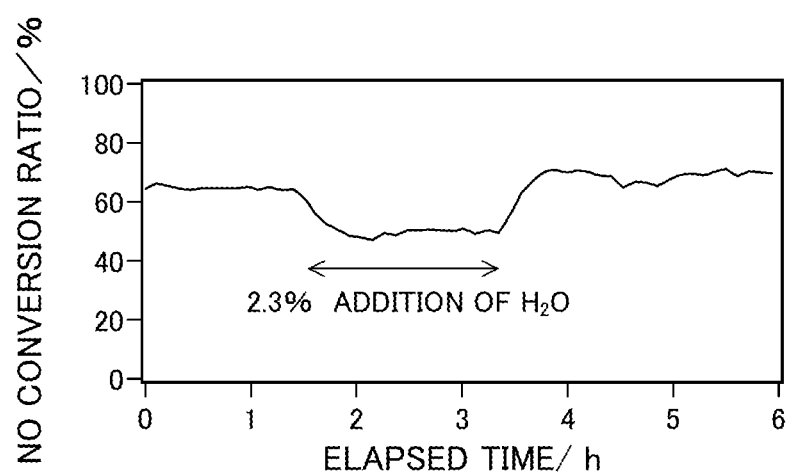
FIG. 8 illustrates a change in the NO conversion ratio over time in the case where a vanadium pentoxide catalyst produced in Reference Example 1 is used in a selective catalytic reduction reaction in coexistence with water.

An experiment of the $NH_3$-SCR reaction was performed using the catalyst in Reference Example 1 ($V_2O_5\_300°$ C.) under the conditions listed in Table 4 below at a reaction temperature of 150° C. at a space velocity of 20 $Lh^{-1}g_{cat}^{-1}$. FIG. 8 illustrates a change in the NO conversion ratio over time in the experiment. As a result of addition of 2.3% $H_2O$ 1.5 hours after the start of the reaction, the NO conversion ratio decreased from 64% to 50%. The addition of $H_2O$ did not change the $N_2$ selectivity. The $N_2$ selectivity was 100%. As a result of stop of the addition of water 3.5 hours after the start of the reaction, the NO conversion ratio increased to 67%.

TABLE 4

$NH_3$-SCR measurement conditions

| | |
|---|---|
| Reaction temperature | 150° C. |
| Amount of catalyst | 0.375 g |
| Total gas flow rate | 250 mLmin$^{-1}$ |
| | (NO: 250 ppm, $NH_3$: 250 ppm, |
| | $O_2$: 4 vol %, Ar balance) |
| Space velocity | 20 $Lh^{-1}g_{cat}^{-1}$ |

(Reaction in Coexistence with S)

Figure 9:
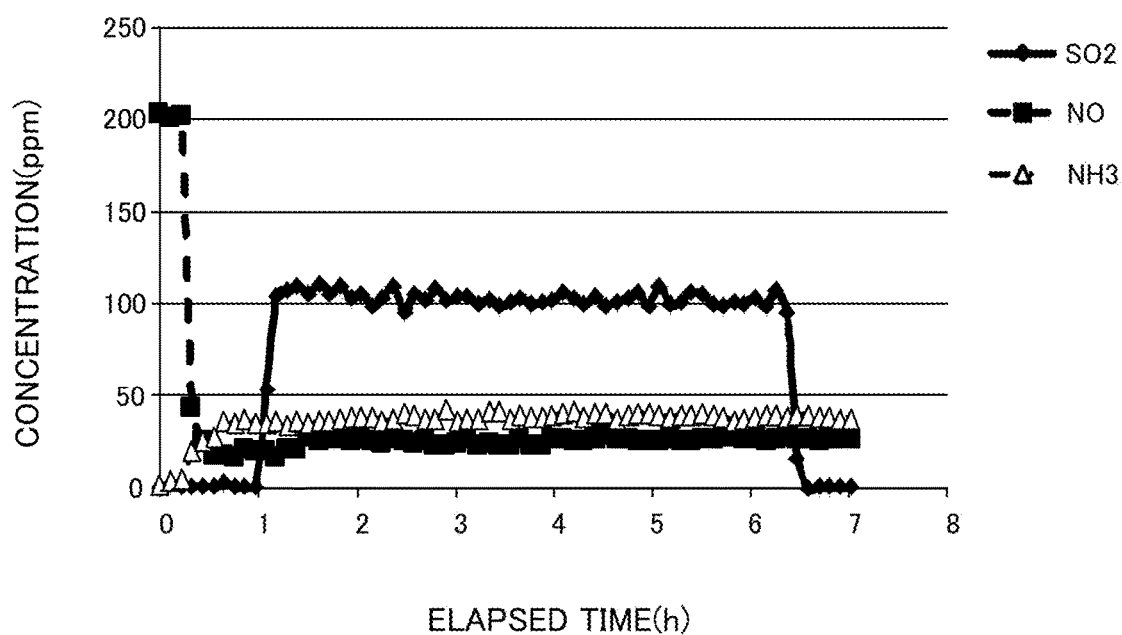
FIG. 9 illustrates changes in the $NH_3$, NO, and $SO_2$ concentrations over time in the case where a vanadium pentoxide catalyst produced in Reference Example 1 is used in a selective catalytic reduction reaction in coexistence with S.

Under the same conditions as those of the experiment of the reaction in coexistence with water, 100 ppm $SO_2$ was caused to flow through a reaction gas. FIG. 9 illustrates the experimental results. No change occurred to the catalytic activity of NO. After the completion of the temperature increase to 150° C., the $SO_2$ concentration did not decrease though $H_2O$ and $O_2$ were constantly present. Consequently, $SO_2$ did not react. Accordingly, the denitration catalysts in Examples were found to have S resistance.

(Relationship Between Amount of Vanadium Pentoxide Supported and NO Conversion Ratio)

Figure 10:
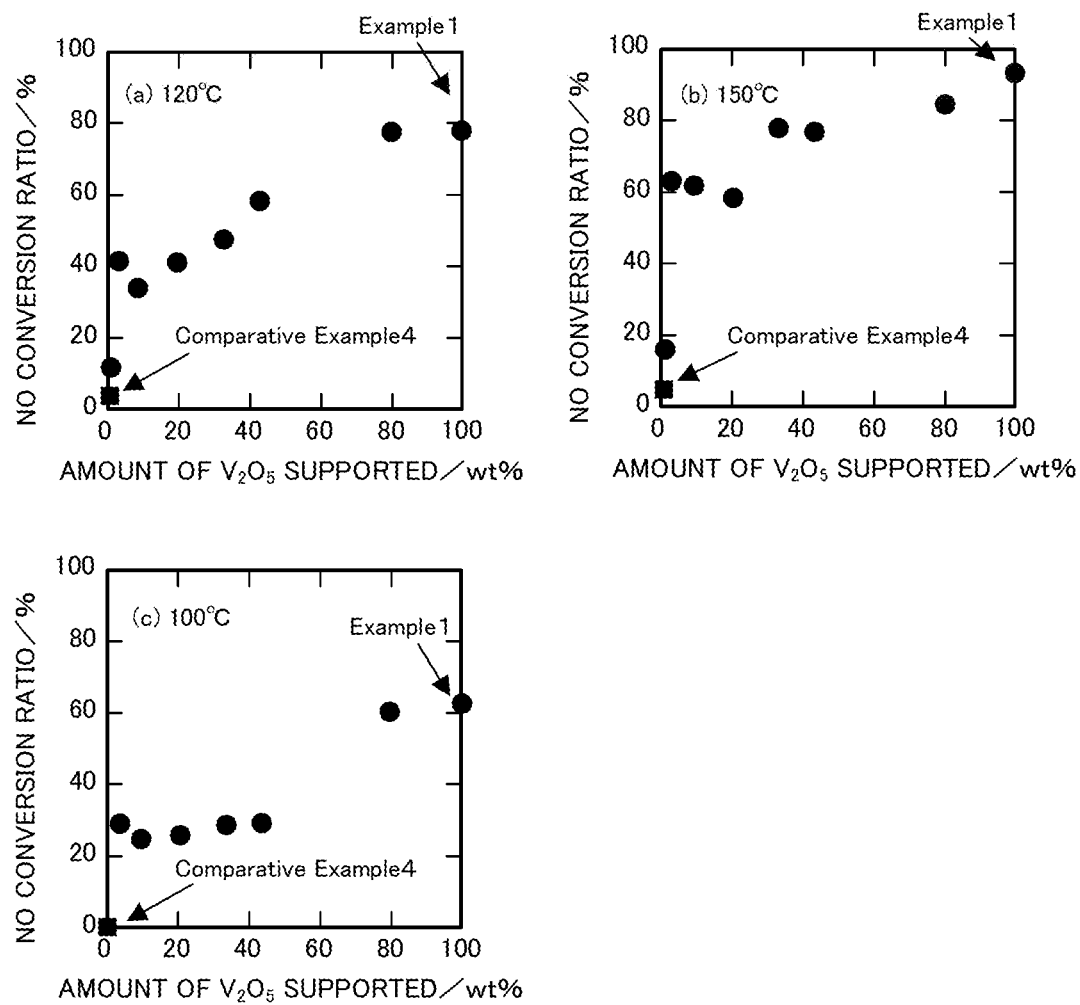
FIG. 10 illustrates the relationship between the amount of vanadium pentoxide supported and the NO conversion ratio of a vanadium pentoxide catalyst produced in each of Examples at each reaction temperature.

FIG. 10 illustrates the relationship between the amount of vanadium pentoxide supported and the NO conversion ratio at each reaction temperature. FIG. 10(a) illustrates the relationship between the amount of vanadium pentoxide supported and the NO conversion ratio at a reaction temperature of 120° C. Similarly, FIG. 10(b) illustrates the relationship between the amount of vanadium pentoxide supported and the NO conversion ratio at a reaction temperature of 150° C., and FIG. 10(c) illustrates the relationship at a reaction temperature of 100° C. In each of the graphs, the catalyst in which the amount of vanadium pentoxide supported is 1.00 wt % is the denitration catalyst $V_2O_5\_SG\_300$ produced in Example 1. The points plotted using a square indicate a NO conversion ratio of the existing catalyst in Comparative Example 4. All the graphs showed that, on the whole, the NO conversion ratio increased as the amount of vanadium pentoxide supported was increased. Herein, all the graphs showed that the catalyst in which the amount of vanadium pentoxide supported was 3.3 wt % had a higher NO conversion ratio than the catalyst in which the amount of vanadium pentoxide supported was 9.0 wt %. Specifically, as illustrated in FIG. 10(a), in the $NH_3$-SCR reaction at a reaction temperature of 120° C., the NO conversion ratio reached 80% when the amount of vanadium pentoxide supported was increased to 80 wt %. As illustrated in FIG. 10(b), in the $NH_3$-SCR reaction at a reaction temperature of 150° C., the NO conversion ratio considerably increased when the amount of vanadium pentoxide supported was increased to 3.3 wt %. As illustrated in FIG. 10(c), in the selective catalytic reduction reaction at a reaction temperature of 100° C., the denitration catalyst in which the amount of vanadium pentoxide supported was 80 wt % had a considerably increased NO conversion ratio compared with the denitration catalysts in which the amounts of vanadium pentoxide supported were 43 wt % or less.

(Relationship Between BET Specific Surface Area and NO Conversion Ratio)

Figure 11:
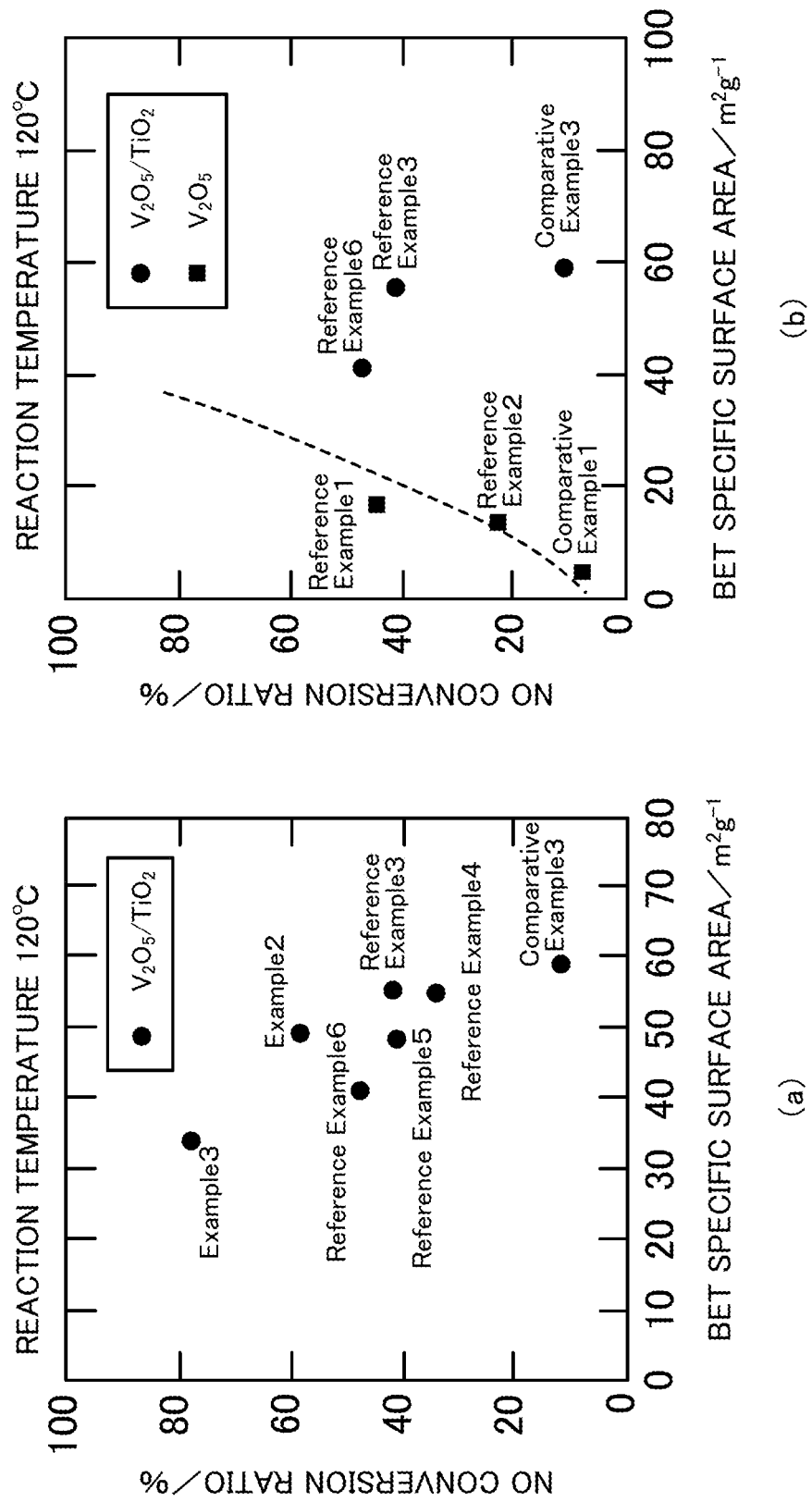
FIG. 11 illustrates the relationship between the BET specific surface area and the NO conversion ratio of a vanadium pentoxide catalyst produced in each of Examples, Reference Examples, and Comparative Examples.

FIG. 11(a) illustrates the relationship between the BET specific surface area and the NO conversion ratio of the denitration catalysts in which vanadium pentoxide was supported on titanium oxide. In the denitration catalyst in which vanadium pentoxide was supported on titanium oxide, as the amount of vanadium pentoxide supported was increased, the BET specific surface area decreased, but the activity increased on the whole. FIG. 11(b) illustrates the relationship between the BET specific surface area and the NO conversion ratio of both the denitration catalysts in which vanadium pentoxide was supported on titanium oxide and the denitration catalysts in which vanadium pentoxide was not supported on titanium oxide. In the catalysts in which vanadium pentoxide was not supported on titanium oxide, the activity increased with increasing the BET specific surface area.

2. $V_2O_5$ Catalyst Produced Through Sol-Gel Process 2.1 Examples (Examples 4 to 6 and Reference Examples 7 and 8)

In "Example 1" of the above-described "1.1 Examples and Comparative Examples", ammonium vanadate was dissolved in an oxalic acid solution such that the molar ratio of vanadium and oxalic acid was 1:3, then water was evaporated, drying was performed, and the resulting dried powder was fired. Thus, a denitration catalyst was produced. In the denitration catalysts of Reference Example 7, Examples 4 to 6, and Reference Example 8, the molar ratios of vanadium and oxalic acid were set to 1:1, 1:2, 1:3, 1:4, and 1:5, respectively. Specifically, as described above, ammonium vanadate was dissolved in an oxalic acid solution (molar ratio of vanadium:oxalic acid=1:1 to 1:5). After ammonium vanadate was completely dissolved, water in the solution was evaporated on a hot stirrer, and drying was performed in a dryer at 120° C. for one night. Then, the dried powder was fired in the air at 300° C. for 4 hours. The sample names were given as "$V_2O_5$_SG_1:1" (Reference Example 7), "$V_2O_5$_SG_1:2" (Example 4), "$V_2O_5$_SG_1:3" (Example 5), "$V_2O_5$_SG_1:4" (Example 6), and "$V_2O_5$_SG_1:5" (Reference Example 8). Herein, the "$V_2O_5$_SG_300" in "Example 1" of "1.1 Examples and Comparative Examples" and "$V_2O_5$_SG_1:3" in Example 5 were substantially the same, but the sample name "$V_2O_5$_SG_1:3" in "Example 5" was used for the sake of convenience of description. To increase the BET specific surface area, a surfactant may be added to the oxalic acid solution. Examples of the surfactant include anionic surfactants such as hexadecyltrimethylammonium bromide (CTAB), sodium lauryl sulfate (SDS), and hexadecylamine; cationic surfactants; amphoteric surfactants; and nonionic surfactants.

2.2 Evaluation 2.2.1 Powder X-Ray Diffraction (Diffraction Method)

In the same manner as in 1.2.1, powder X-ray diffraction analysis was performed with a Rigaku smart lab using Cu-Ka.

(Diffraction Result)

Figure 12:
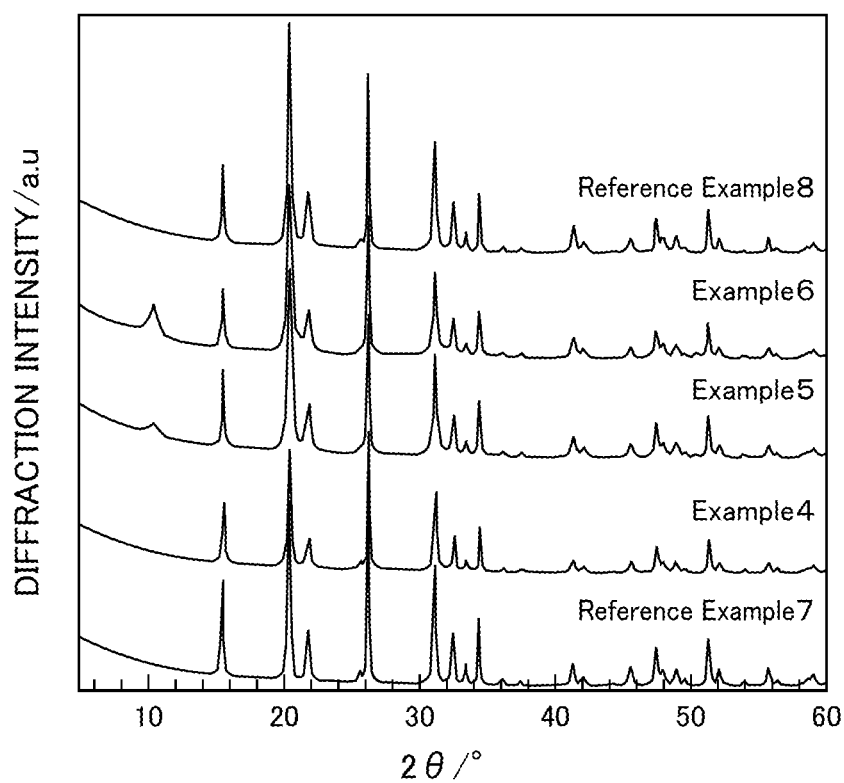
FIG. 12 illustrates the powder X-ray diffraction results of vanadium pentoxide catalysts produced in Examples 4 to 6 and Reference Examples 7 and 8.

FIG. 12 illustrates powder XRD patterns of Reference Example 7, Examples 4 to 6, and Reference Example 8 ($V_2O_5$_SG). In the vanadium pentoxides (Reference Examples 7, 7, and 10) produced using the solutions having vanadium:oxalic acid ratios of 1:1, 1:2, and 1:5, only peaks for orthorhombic $V_2O_5$ were detected. In the vanadium pentoxides (Examples 5 and 6) produced using the solutions having vanadium:oxalic acid ratios of 1:3 and 1:4, an unidentified peak was detected at 11° in addition to the peaks for orthorhombic $V_2O_5$. However, the peak has not been identified yet.

2.2.2 Measurement of BET Specific Surface Area (Measurement Method)

In the same manner as in 1.2.3, the BET specific surface area was measured with a MicrotracBEL BELSORP-max. Pretreatment was performed in an Ar atmosphere at 200° C. for 2 hours, and then measurement was performed at 196° C.

(Measurement Result)

TABLE 5

BET specific surface area of vanadium pentoxide catalyst

| Catalyst | | BET specific surface area before reaction/m$^2$g$^{-1}$ | BET specific surface area after reaction/m$^2$g$^{-1}$ |
|---|---|---|---|
| Reference Example7 | ($V_2O_5$_SG_1:1) | 29.9 | n.d. |
| Example4 | ($V_2O_5$_SG_1:2) | 33.5 | n.d. |
| Example5 | ($V_2O_5$_SG_1:3) | 62.9 | 43.4 |
| Example6 | ($V_2O_5$_SG_1:4) | 57.0 | n.d. |
| Reference Example8 | ($V_2O_5$_SG_1:5) | n.d. | n.d. |

Table 5 shows BET specific surface areas of Reference Example 7 ($V_2O_5$_SG_1:1), Example 4 ($V_2O_5$_SG_1:2), Example 5 ($V_2O_5$_SG_1:3), Example 6 ($V_2O_5$_SG_1:4), and Reference Example 8 ($V_2O_5$_SG_1:5). As the ratio of the oxalic acid was increased, the specific surface area increased at vanadium:oxalic acid ratios of 1:1 to 1:3. When the ratio of the oxalic acid was further increased, the specific surface area decreased. The specific surface area in Example 5 ($V_2O_5$_SG_1:3) after the catalytic activity test described below considerably decreased to 43.4 m$^2$g$^{-1}$ compared with the specific surface area before the catalytic activity test.

2.2.3 Measurement of Catalytic Activity (Measurement Method)

By the same measurement method as in 1.2.4, the $NH_3$-SCR activity of each $V_2O_5$_SG catalyst was measured and the NO conversion ratio was calculated.

(Measurement Result)

Figure 13:
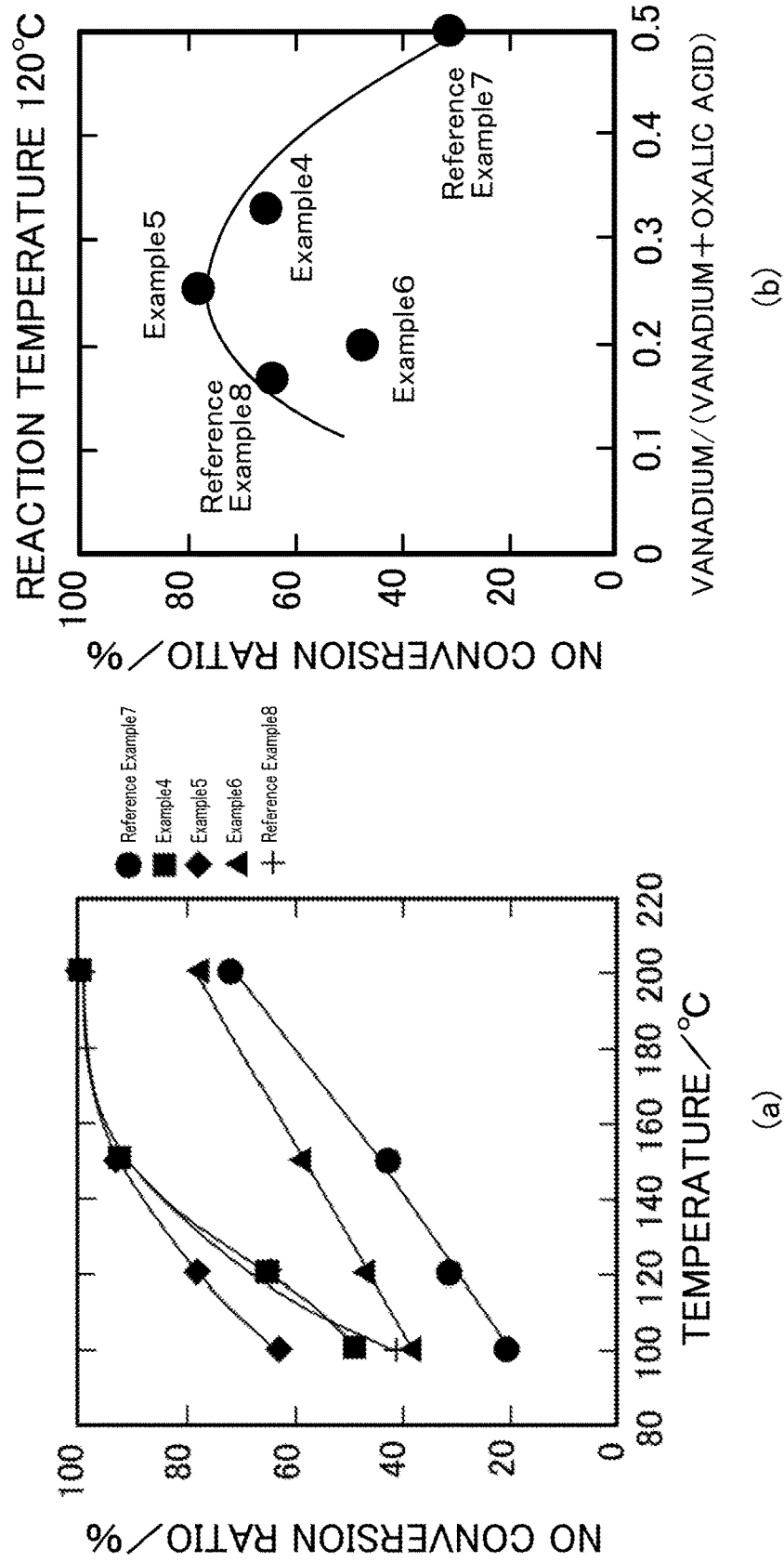
FIG. 13 illustrates the $NH_3$-SCR activity of vanadium pentoxide catalysts produced in Examples 4 to 6 and Reference Examples 7 and 8.

FIG. 13 illustrates the $NH_3$-SCR activity of each $V_2O_5$_SG catalyst. FIG. 13(a) illustrates the NO conversion ratio plotted against reaction temperature in the $NH_3$-SCR reaction that uses each catalyst. FIG. 13(b) illustrates the relationship between the vanadium:oxalic acid ratio and the NO conversion ratio at a reaction temperature of 120° C. In the catalyst of Example 5 ($V_2O_5$_SG_1:3) having a vanadium:oxalic acid ratio of 1:3, the highest NO conversion ratio was achieved. When the oxalic acid was further added, the NO conversion ratio decreased. The NO conversion ratio in Example 6 ($V_2O_5$_SG_1:4) was lower than that in Example 4 ($V_2O_5$_SG_1:2) despite the fact that the specific surface area in Example 6 was larger than that in Example 4.

(Relationship Between Specific Surface Area and NO Conversion Ratio)

Figure 14:
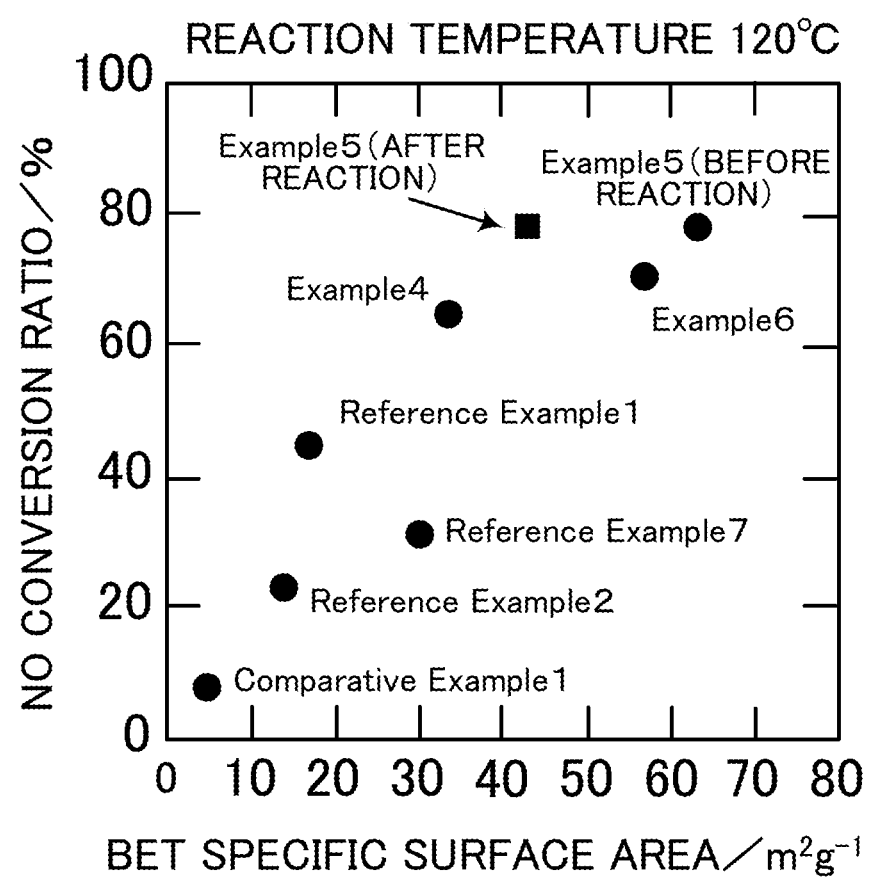
FIG. 14 illustrates the relationship between the specific surface area and the NO conversion ratio of vanadium pentoxide catalysts produced in Examples 4 to 6, Reference Examples 1, 2, and 7, and Comparative Example 1.

FIG. 14 illustrates the relationship between the BET specific surface area and the NO conversion ratio in Examples 4 to 6 and Reference Example 7 ($V_2O_5$_SG), Reference Example 1 ($V_2O_5$_300), Reference Example 2 ($V_2O_5$_400), and Comparative Example 1 ($V_2O_5$_500). The point plotted using a square indicates the relationship between the BET specific surface area and the NO conversion ratio after the selective catalytic reduction reaction in Example 5 ($V_2O_5$_1:3). As described above, it was shown that the highest NO conversion ratio was achieved in the catalyst of Example 5 ($V_2O_5$_SG_1:3) having a vanadium:oxalic acid ratio of 1:3.

2.2.4 Characterization by $NH_3$-TPD (Measurement Method)

The amount of acid sites on the surface of the catalyst can be estimated by $NH_3$-TPD (TPD: temperature programed desorption). In a BELCAT manufactured by MicrotracBEL Corp., 0.1 g of each of the catalysts in Reference Example 1 ($V_2O_5$_300), Reference Example 2 ($V_2O_5$_400), Comparative Example 1 ($V_2O_5$_500), Example 4 ($V_2O_5$_1:2), and Example 5 (V$_2$O$_5$_SG_1.3) was pretreated at 300° C. for 1 hour while He (50 ml/min) was caused to flow. Then, the temperature was decreased to 100° C., and 5% ammonia/He (50 ml/min) was caused to flow for 30 minutes to adsorb ammonia. The flow gas was changed to He (50 ml/min) and this state was kept for 30 minutes for stabilization. Then, the temperature was increased at 10° C./min and ammonia, which has a mass number of 16, was monitored with a mass spectrometer.

(Measurement Result)

TABLE 6

Measured amount of NH$_3$ desorbed by NH$_3$-TPD

| Catalyst | | Amount of NH$_3$ desorbed/µmolg$^{-1}$ |
|---|---|---|
| Reference Example1 | (V$_2$O$_5$_300) | 22.9 |
| Reference Example2 | (V$_2$O$_5$_400) | 14.0 |
| Comparative Example1 | (V$_2$O$_5$_500) | 5.21 |
| Example4 | (V$_2$O$_5$_SG_1:2) | 51.4 |
| Example5 | (V$_2$O$_5$_SG_1:3) | 77.5 |

Figure 15:
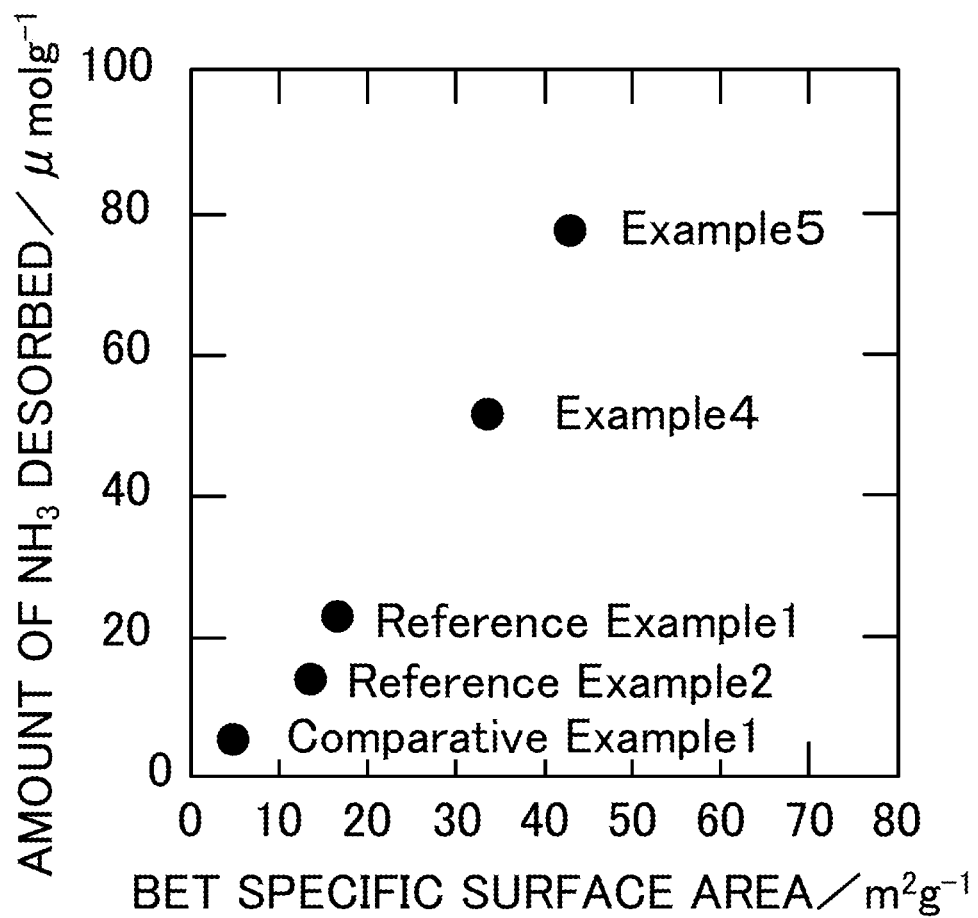
FIG. 15 illustrates the relationship between the BET specific surface area and the amount of $NH_3$ desorbed of vanadium pentoxide catalysts produced in Examples 4 and 5, Reference Examples 1 and 2, and Comparative Example 1.
Figure 16:
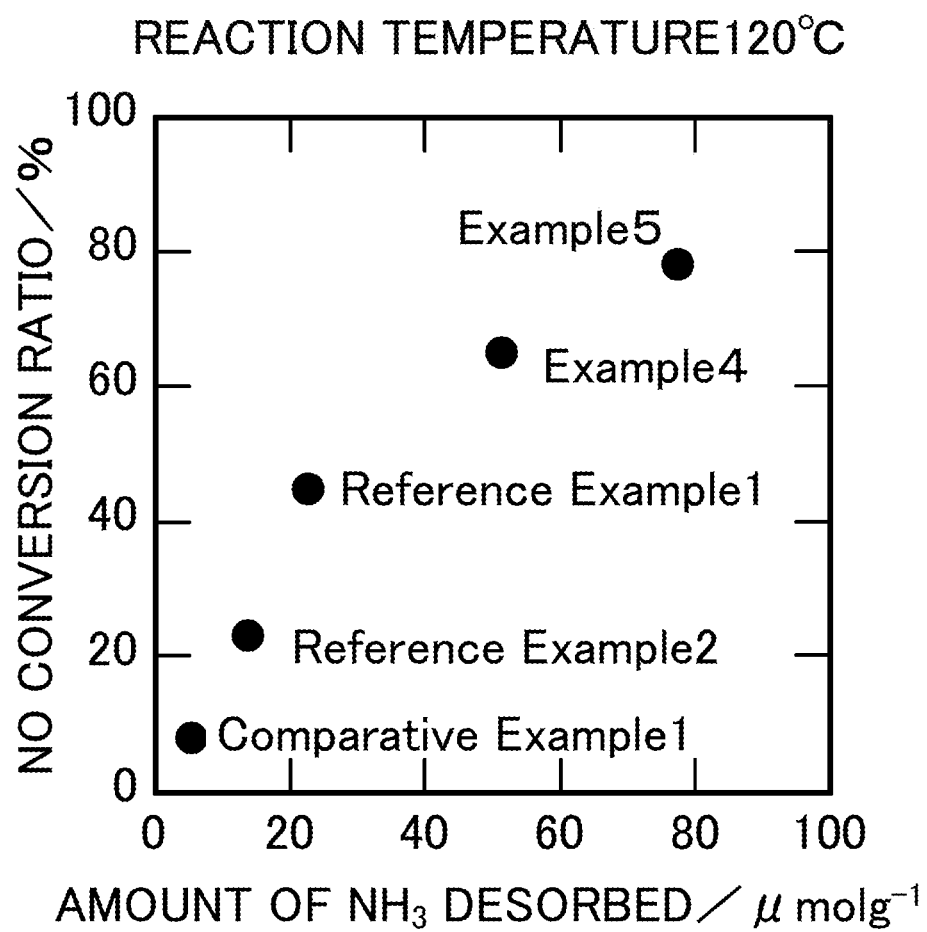
FIG. 16 illustrates the relationship between the amount of $NH_3$ desorbed and the NO conversion ratio of vanadium pentoxide catalysts produced in Examples 4 and 5, Reference Examples 1 and 2, and Comparative Example 1.

Table 6 shows the measurement results of the amount of NH$_3$ desorbed when the catalysts in Reference Example 1 (V$_2$O$_5$_300), Reference Example 2 (V$_2$O$_5$_400), Comparative Example 1 (V$_2$O$_5$_500), Example 4 (V$_2$O$_5$_SG_1:2), and Example 5 (V$_2$O$_5$_SG_1:3) were used. FIG. 15 is a graph obtained by plotting the amount of NH$_3$ desorbed as a function of the BET specific surface area of each catalyst. The graph in FIG. 15 showed that the amount of NH$_3$ desorbed increased substantially in proportion to the BET specific surface area of V$_2$O$_5$. FIG. 16 is a graph obtained by plotting the NO conversion ratio as a function of the amount of NH$_3$ desorbed in each catalyst. The graph showed that the NO conversion ratio increased as the catalyst had a larger amount of NH$_3$ desorbed, that is, a larger amount of acid sites on the surface of the catalyst.

As described above, the denitration catalyst of the present invention that contains 3.3 wt % or more of vanadium oxide in terms of vanadium pentoxide and has a specific surface area of 10 m$^2$/g or more exhibits a high denitration efficiency at a low temperature of 200° C. or lower in the selective catalytic reduction reaction that uses ammonia as a reducing agent. On the other hand, oxidation of SO$_2$ is not found.

EXPLANATION OF REFERENCE NUMERALS

1 combustion system
10 boiler
30 air preheater
50 electric dust collector
90 denitration device
L1 exhaust line

The invention claimed is:

1. A combustion system comprising:
    a combustion device that burns fuel;
    an exhaust line through which exhaust gas flows, the exhaust gas being generated through combustion of the fuel in the combustion device;
    a dust collector that is disposed in the exhaust line and that collects dust in the exhaust gas; and
    a denitration device that is disposed in the exhaust line and that removes nitrogen oxide from the exhaust gas using a denitration catalyst,
    wherein the denitration device is disposed downstream from the dust collector in the exhaust line, and
    the denitration catalyst contains 43 wt % or more of vanadium pentoxide and has a BET specific surface area of 30 m$^2$/g or more.

2. The combustion system according to claim 1, further comprising an air preheater that is disposed in the exhaust line and that recovers heat from the exhaust gas,
    wherein the air preheater is disposed upstream from the dust collector.

3. The combustion system according to claim 1, wherein in the denitration catalyst, an amount of NH$_3$ desorbed by NH$_3$-TPD (TPD: temperature programed desorption) is 10.0 µmol/g or more.

4. The combustion system according to claim 1, wherein the denitration device removes nitrogen oxide from the exhaust gas by a selective catalytic reduction method.

5. The combustion system according to claim 1, wherein the fuel is coal.

* * * * *